United States Patent [19]

Shibata et al.

[11] Patent Number: 5,606,554
[45] Date of Patent: *Feb. 25, 1997

[54] TELECONFERENCE TERMINAL EQUIPMENT AND TELECONFERENCE MODULE

[75] Inventors: Yoji Shibata, Yokosuka; Masaaki Takizawa, Tokyo; Hitoshi Matsushima, Tachikawa; Kiyoshi Ishida, Yokohama; Atsuo Yoshida; Atsushi Ishibashi, both of Kokubunji; Takehiko Yamada, Chigasaki, all of Japan

[73] Assignee: Hitachi, Ltd., Tokyo, Japan

[*] Notice: The term of this patent shall not extend beyond the expiration date of Pat. No. 5,477,546.

[21] Appl. No.: 450,997

[22] Filed: May 25, 1995

Related U.S. Application Data

[63] Continuation of Ser. No. 913,489, Jul. 15, 1992, Pat. No. 5,477,546.

[30] Foreign Application Priority Data

Jul. 15, 1991 [JP] Japan .................................. 3-174046
Jan. 29, 1992 [JP] Japan .................................. 4-014173

[51] Int. Cl.$^6$ .............................. H04L 12/18; H04N 7/14
[52] U.S. Cl. ............................................... 370/260; 348/15
[58] Field of Search ........................ 370/62, 58.1, 58.2, 370/58.3, 68.1, 110.1; 379/202, 203, 204, 205, 206, 96, 100; 348/12, 14, 15, 16, 17, 18, 19, 20, 21, 375, 836, 839; 340/825.29, 825.31

[56] References Cited

U.S. PATENT DOCUMENTS

| | | | |
|---|---|---|---|
| 4,574,374 | 3/1986 | Scordo | 370/62 |
| 4,847,829 | 7/1989 | Tompskin et al. | 370/62 |
| 4,907,221 | 3/1990 | Pariani et al. | 370/62 |
| 4,998,243 | 3/1991 | Kao | 370/62 |
| 5,061,992 | 10/1991 | Ueno | 348/15 |
| 5,062,136 | 10/1991 | Gattis | 380/18 |
| 5,477,546 | 12/1995 | Shibata | 340/62 |

FOREIGN PATENT DOCUMENTS

| | | |
|---|---|---|
| 0418396A1 | 3/1991 | European Pat. Off. . |
| 2-22989 | 1/1990 | Japan . |
| 2-39790 | 2/1990 | Japan . |
| 2039696 | 4/1990 | Japan . |
| 2095089 | 6/1990 | Japan . |
| 2095090 | 6/1990 | Japan . |
| 2104080 | 7/1990 | Japan . |
| 3035679 | 4/1991 | Japan . |

*Primary Examiner*—Wellington Chin
*Assistant Examiner*—Huy D. Vu
*Attorney, Agent, or Firm*—Antonelli, Terry, Stout & Kraus, LLP

[57] ABSTRACT

A teleconference terminal equipment adapted to construct an AV meeting system as an intended use, comprising a network interface and communications network control unit, a multimedia multiplexing/demultiplexing and interterminal signal control unit which multiplexes and demultiplexes video data and control data contained in a communication frame to be transmitted by the control unit and a communication frame received by the same, respectively, a picture codec which codes and decodes video data, a video input/output interface which connects an external camera to the picture codec, a camera control/external device multiconnector, and a CPU which controls an operation of the external camera through the multiconnector on the basis of control data delivered from the control unit.

9 Claims, 31 Drawing Sheets

(a)

(b)

(c)

(d)

(e)

(f)

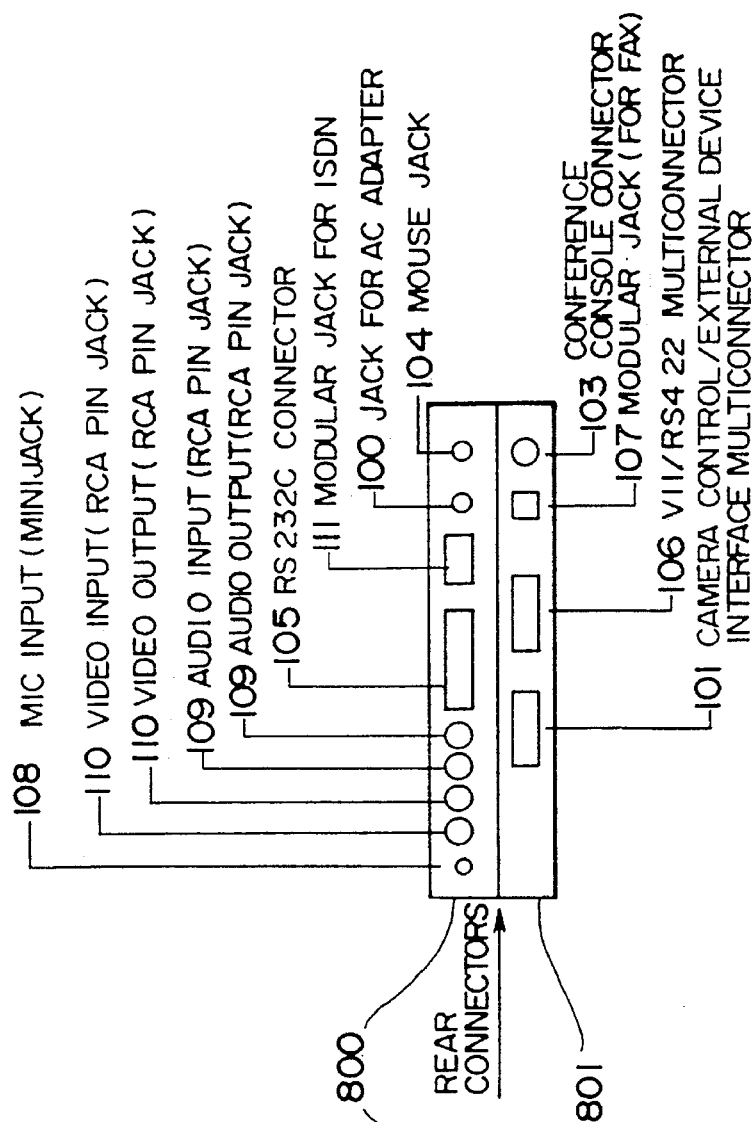
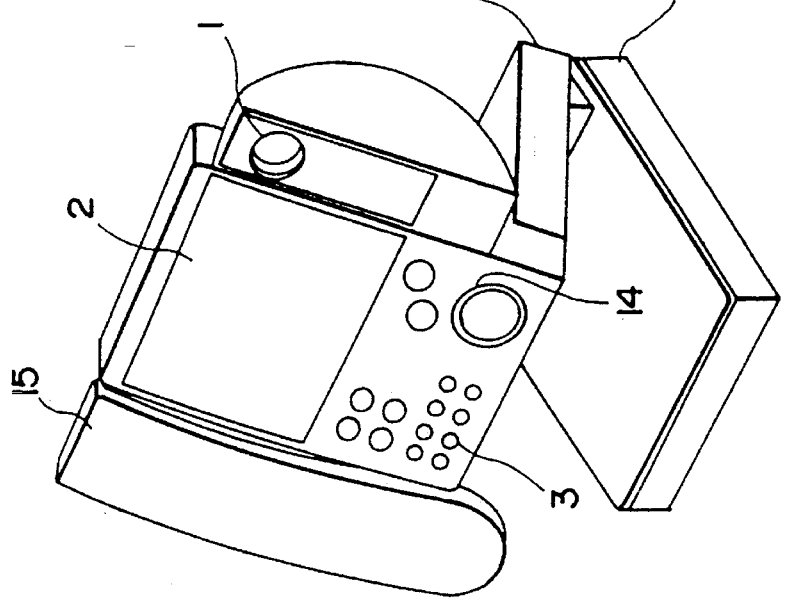

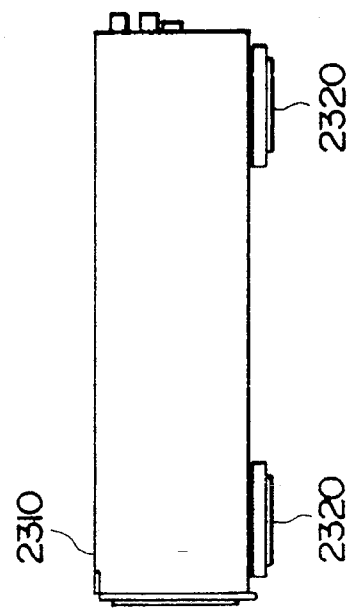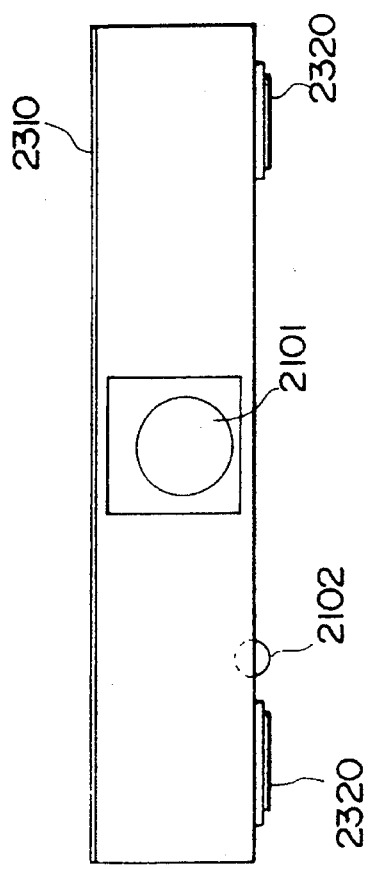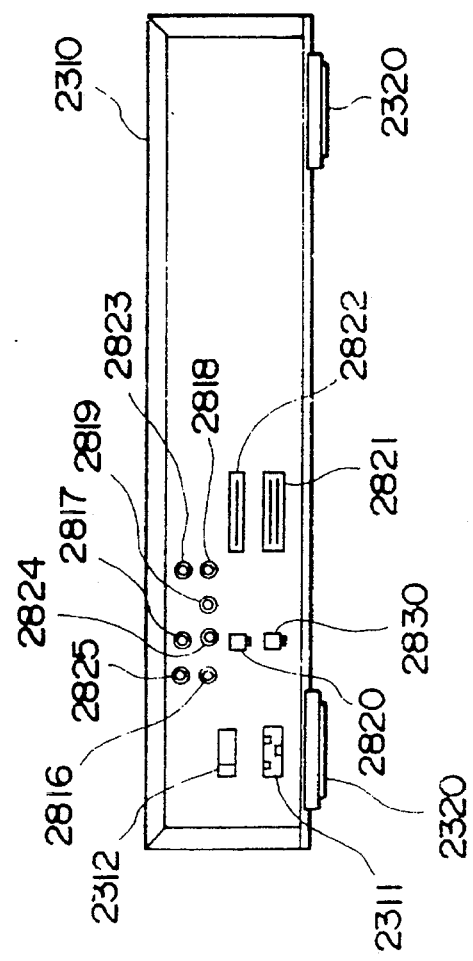

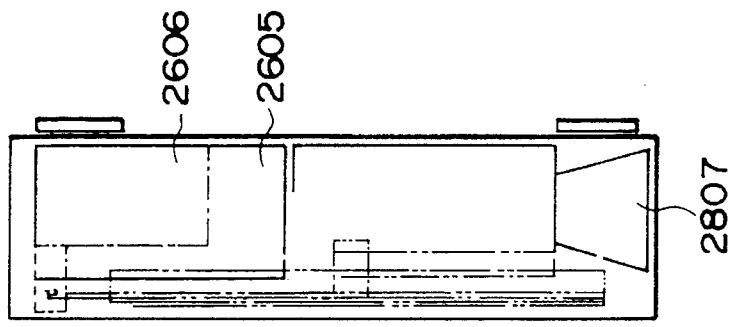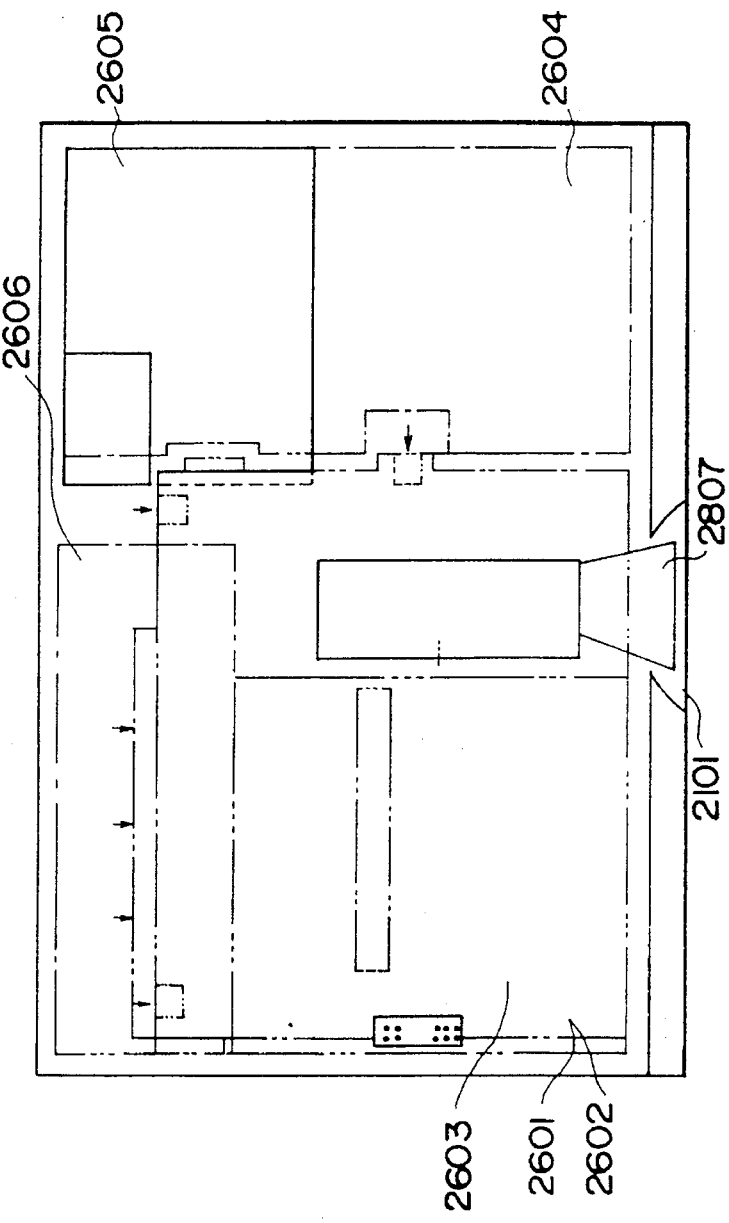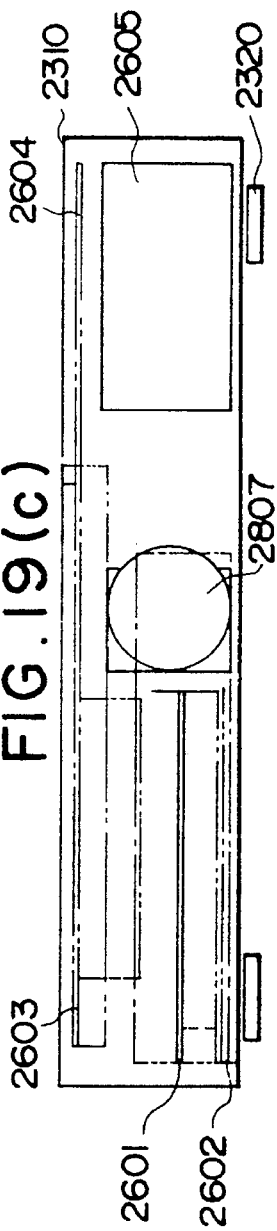

2920

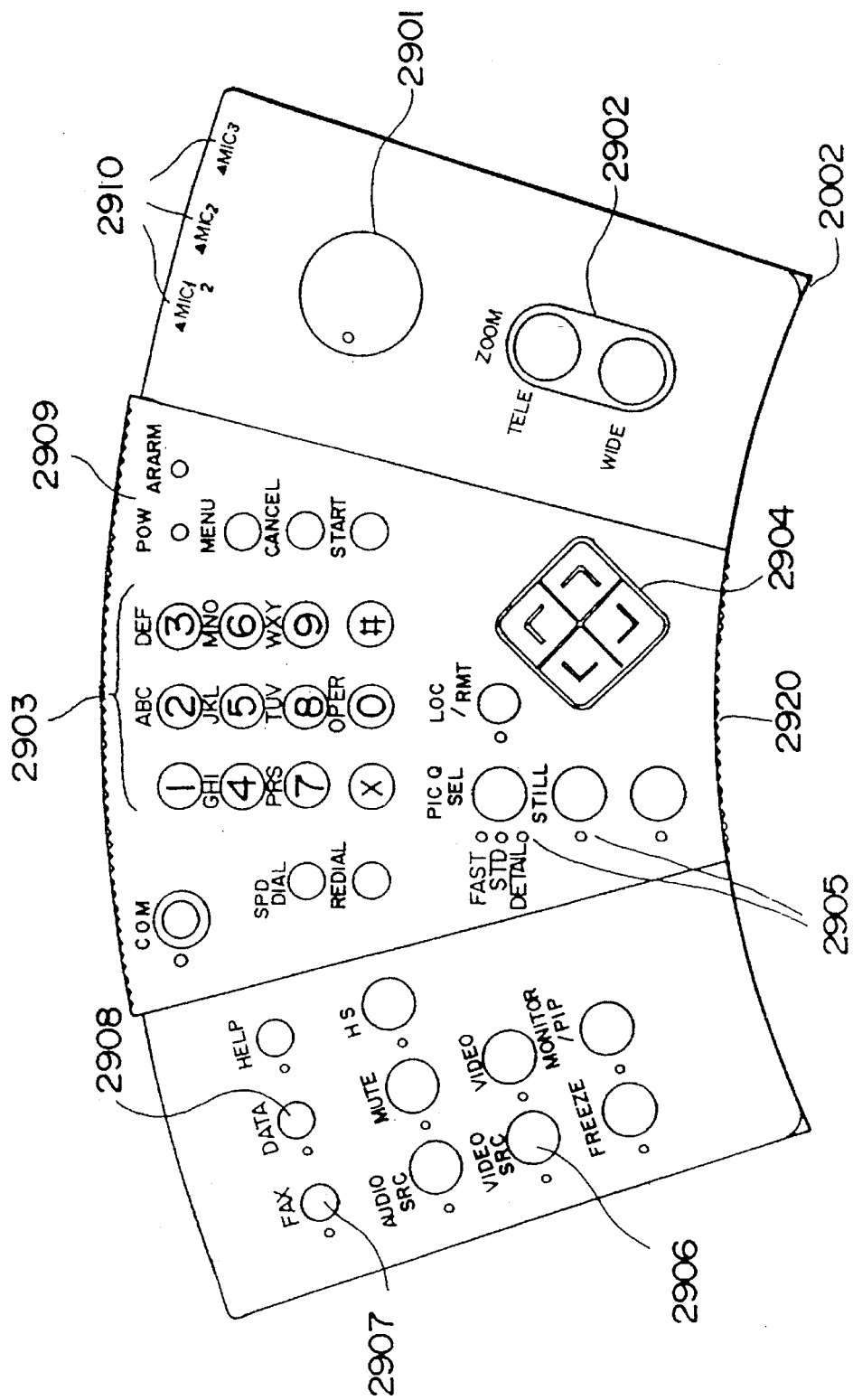

FIG.28(a)
FIG.28(b)
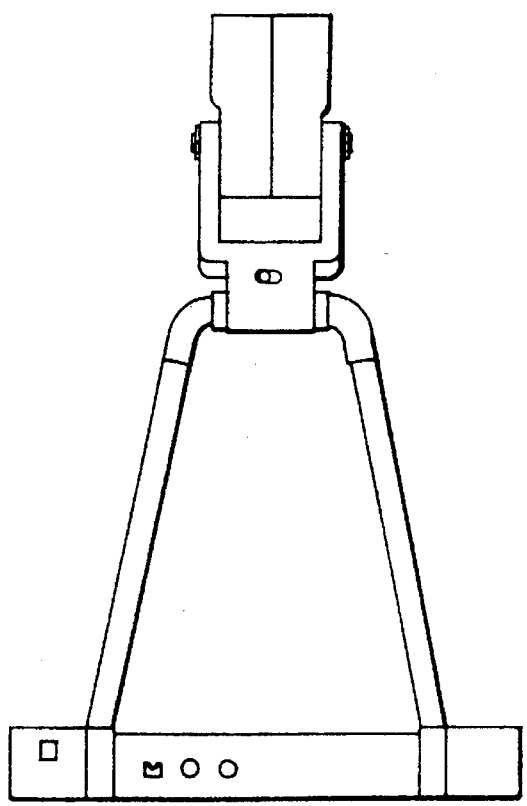
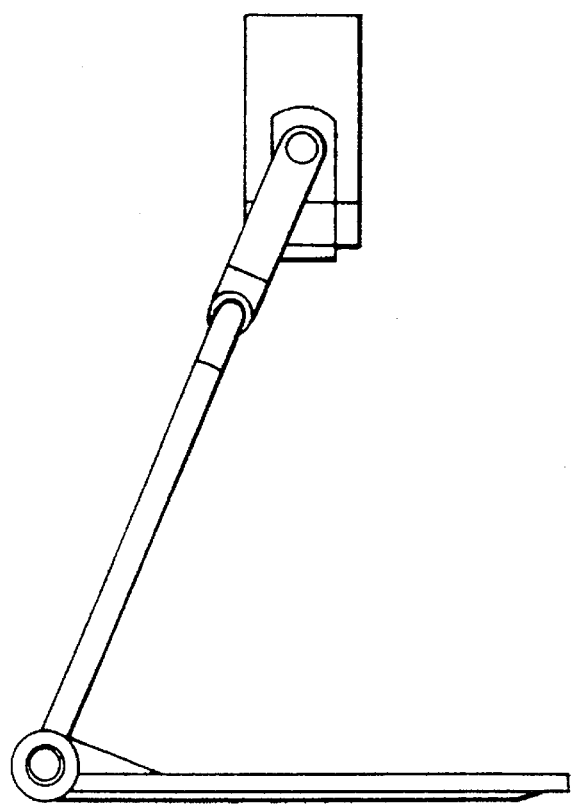

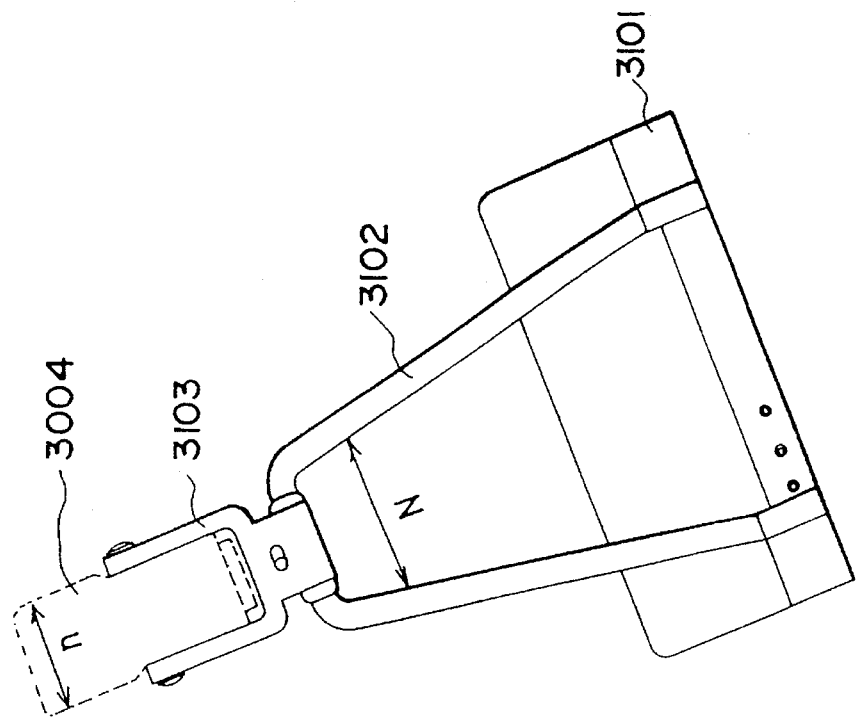
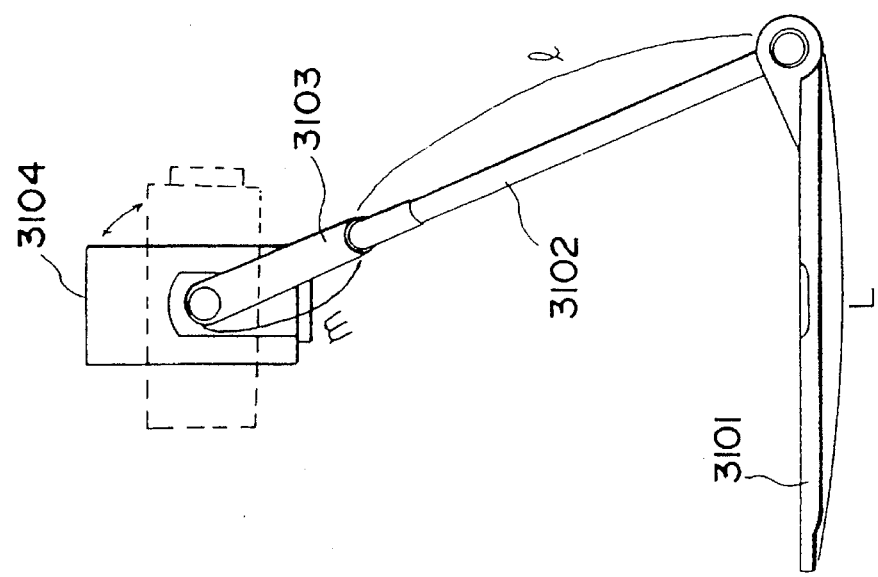

5,606,554

TELECONFERENCE TERMINAL EQUIPMENT AND TELECONFERENCE MODULE

This is a continuation of application Ser. No. 07/913,489, filed Jul. 15, 1992 now U.S. Pat. No. 5,477,546.

BACKGROUND OF THE INVENTION

1. Field of the Invention

The present invention relates to a teleconference system which exchanges speech, video etc. through a communication circuit in real time.

2. Description of the Prior Art

Heretofore, a video telephone system and a teleconference system have been known as systems in each of which speech, video etc. are exchanged through a communication circuit in real time.

The video telephone system is chiefly intended for telephonic communications between one person and another similar to a conventional telephone. On the other hand, the teleconference system is intended for teleconference between a number of people, and it has a construction in which importance is attached to meeting functions required for such a teleconference.

A prior-art equipment for the teleconference system is constructed by combining independent devices such as a display unit, a codec, a microphone and a console. In some cases, a document camera, an electronic blackboard and a small-sized computer are further combined in accordance with functions required for conferences.

There is also a teleconference equipment wherein fundamental devices are housed in a single rack so as to be movable, thereby dispensing with the need for an exclusive conference room.

Techniques relevant to these equipments are disclosed in the official gazettes of Japanese Patent Applications Laid-open No. 9790/1990 and No. 22989/1990.

In addition, Japanese Patent Applications relevant to teleconference systems filed by the assignee of the present application are Patent Applications Laid-open Nos. 166884/1991 and 120889/1992, and Patent Applications Nos. 406984/1990, 5987/1991, 25991/1991, 34009/1991, 174025/1991, 174031/1991 and 174049/1991.

Most of the video telephone systems in the prior art do not have the high-degree functions necessary for teleconferences such as the teleconference systems have, because it is presumed that they are only used between one person and another. On the contrary, teleconference systems in the prior art are inherently endowed with such high-degree functions. In consequence, however, they become high in cost and large in size and are not suitable for a simple telephone conversation between one person and another.

In general, it is required of a teleconference that many people can watch a screen at the same time. Therefore, a display unit should desirably be large to some extent. Besides, codecs for processing a large amount of picture information at high speed have not to date been reduced in size considerably, and most of them are large in size.

For these reasons, the prior-art equipment for the teleconference system constructed by combining such devices is large in scale, and a teleconference room for exclusive use is usually necessitated. Accordingly, the introduction of a teleconference system involves a heavy financial burden. Moreover, when holding the teleconference, conferees must move to the teleconference room which is inconvenient. In this regard, even portable teleconference equipment needs many people to move it on account of its size and weight and cannot be used with ease.

Meanwhile, the display unit which is most common at present is a CRT display device, which is mainly used for displaying the received pictures of television broadcasting. Since such a display unit is essentially a versatile device, it can construct a BS (broadcasting by satellite) receiving system conjointly with a BS receiver module connected thereto and a playback display system for recorded pictures conjointly with a video tape recorder module connected thereto. Therefore, such display units are already installed in many places where people gather, such as living rooms in homes and conference rooms. Herein, the display unit for use in the teleconference system need not be a special device. Incidentally, this is also true of the video telephone system wherein speech and pictures are exchanged in one to one correspondence.

SUMMARY OF THE INVENTION

In view of the above circumstances, the present invention has for its object the provision of a teleconference system which can flexibly cope with all intended uses.

Another object of the present invention is to provide a teleconference module which is a unitary apparatus being small in size and easily portable and which can realize a teleconference system or a video telephone system when connected to an existing display unit.

In one aspect of performance of the present invention, there is provided a teleconference terminal equipment for exchanging pictures and speech with an opposite communicating terminal equipment through a communication circuit which comprises communication control means for transmitting and receiving communication frames through a digital communication channel, each communication frame being capable of containing video data, audio data, user data and control data, multiplex/demultiplex means for, respectively, multiplexing and demultiplexing the video data, audio data, user data and control data of each communication frame to be transmitted or received by the communication control means, a picture codec which decodes a picture signal from the video data demultiplexed from within the communication frame by the multiplex/demultiplex means and then delivers the picture signal as an output, and which codes an input picture signal to-be-coded into the video data and then transfers the video data to the multiplex/demultiplex means, a camera which supplies the picture codec with a picked-up picture signal as the picture signal to-be-coded; a display unit which displays a picture indicated by the picture signal decoded by the picture codec, an audio codec which decodes a speech signal from the audio data demultiplexed from within the communication frame by the multiplex/demultiplex means and then delivers the speech signal as an output, and which codes an input audio signal to-be-coded into the audio data and then transfers the audio data to the multiplex/demultiplex means, a microphone which supplies the audio codec with a picked-up speech signal as the speech signal to-be-coded, a loudspeaker which emits speech based on the audio signal decoded by the audio codec, a video input/output interface which supplies the picture codec with an external input picture signal as the picture signal to-be-coded, and which delivers the picture signal decoded by the picture codec, as an external output; a camera control interface which produces a camera control signal for controlling the operation of an external camera connected outside said teleconference terminal equipment and a control unit which controls the produced camera control signal of the camera control interface on the basis of the control data demultiplexed from within the communication frame by the multiplex/demultiplex means.

In operation, the teleconference terminal equipment and the opposite equipment can communicate with each other through direct controls, so that the intended uses of such terminal equipments can be flexibly coped with.

BRIEF DESCRIPTION OF THE DRAWINGS

FIGS. 8(a) and 8(b) are a perspective view and a rear view showing the external appearances of the teleconference terminal equipment of the first embodiment, respectively;

FIGS. 16(a), 16(b) and 16(c) are a front view, a side view and a rear view of the teleconference module of the second embodiment, respectively;

FIGS. 19(a), 19(b) and 19(c) are a schematic plan view, a schematic side view and a schematic front view showing the internal construction of the teleconference module of the second embodiment, respectively;

FIG. 22 is an explanatory view showing the key arrangement of the control keyboard of the second embodiment;

FIGS. 28(a) and 28(b) are a rear view and a left side view of the document photographing stand of the second embodiment, respectively;

FIGS. 29(a) and 29(b) are views for explaining the relationships among the dimensions of the constituent parts of the document photographing stand of the second embodiment;

PREFERRED EMBODIMENTS OF THE INVENTION

Now, the first embodiment of a teleconference terminal equipment according to the present invention will be described.

Figure 1:
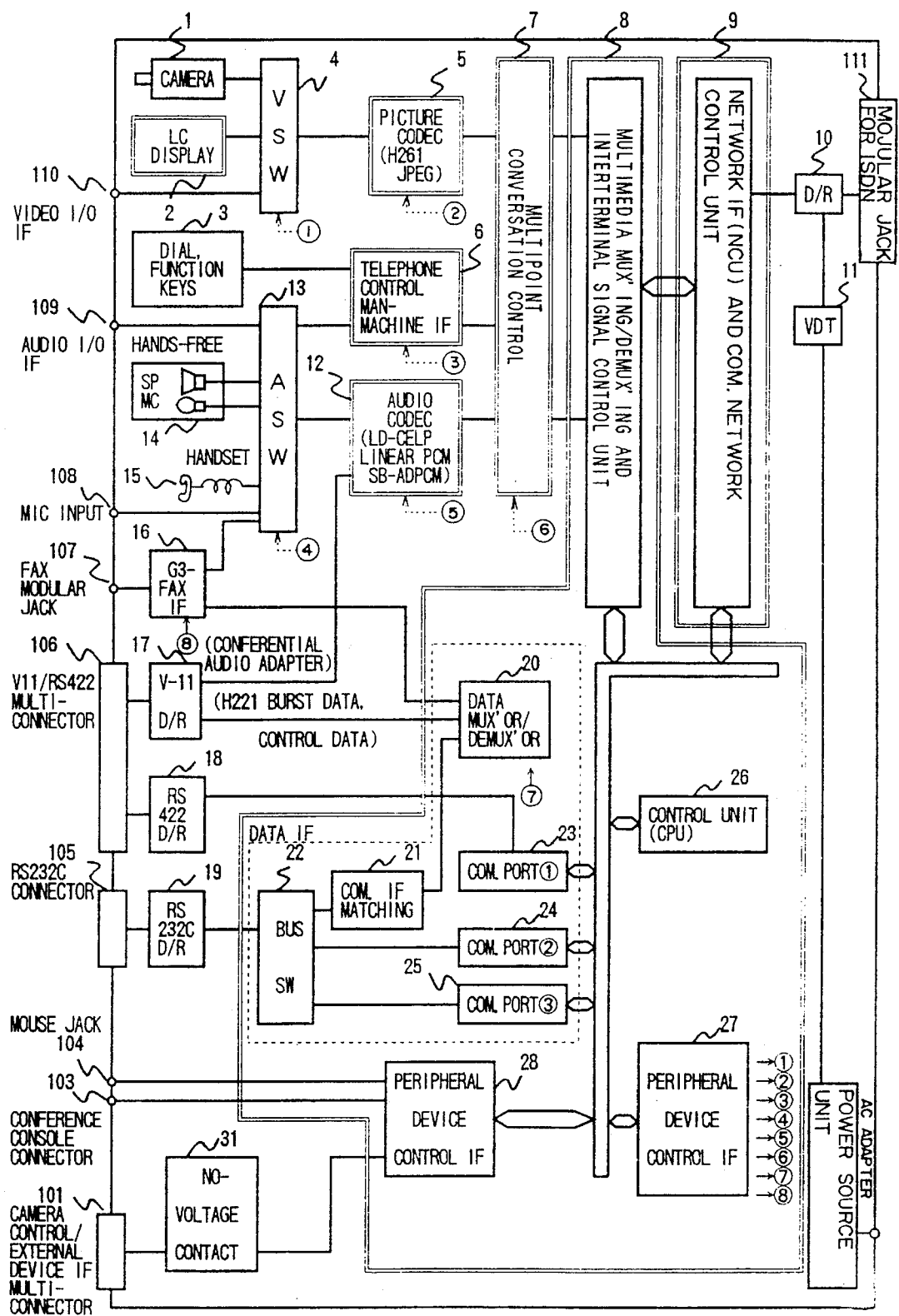
FIG. 1 is a block diagram showing the general arrangement of a teleconference terminal equipment according to the first embodiment of the present invention.

FIG. 1 illustrates the block arrangement of the teleconference terminal equipment in this embodiment.

As shown in the figure, the teleconference terminal equipment of this embodiment comprises a camera 1, an LCD (liquid-crystal display) 2, dial function keys 3, a VSW (video switch) 4, a picture codec 5, a telephone control man-machine interface 6, a multipoint conversation control 7, a multimedia multiplexing/demultiplexing and interterminal signal control unit 8, a network interface and communications network control unit 9, a D/R (driver) 10, a VDT (voltage detector) 11, a audio codec 12, an ASW (audio switch) 13, a hands-free set 14, a handset 15, a G3-FAX interface 16, a V11 D/R 17, an RS422 D/R 18, an RS232C D/R 19, a data multiplexor/demultiplexor 20, a communication interface matching section 21, a bus SW (switch) 22, communication ports 23–25, a control unit 26, peripheral device control interfaces 27–28, and a no-voltage contact 31.

In addition, as external input/output terminals, the teleconference terminal equipment comprises a video I/O interface 110, an audio I/O interface 109, a microphone input 108, a G3-FAX modular jack 107, a V11/RS422 multiconnector 106, an RS232C connector 105, a mouse jack 104, a conference console connector 103, and a camera control/ external device multiconnector 101.

The network interface and communications network control unit 9 is connected to a digital communications network through the D/R 10, and it performs the communication controls and communication processing between the teleconference terminal equipment and the network, such as establishing a communication channel with the opposite communicating terminal equipment. The multimedia multiplexing/demultiplexing and interterminal signal control unit 8 performs various controls between the pertinent terminal equipment and the opposite terminal equipment. Besides, this control unit 8 demultiplexes video data, audio data, data to be multiplexed/demultiplexed, control data, etc. from within a received communication frame into the individual data types, and it multiplexes such types of data into a transmission communication frame. The video data mentioned above is interface data on the network side of the picture codec 5, while the audio data is interface data on the network side of the audio codec 12. The data to be multiplexed/demultiplexed is interface data with respect to the data multiplexor/demultiplexor 20. The control data is transferred between the control unit 8 and the control unit 26.

The data multiplexor/demultiplexor 20 further demultiplexes the data demultiplexed from within the received communication frame by the multimedia multiplexing/demultiplexing and interterminal signal control unit 8, into individual data types in accordance with protocols stipulated with the opposite communicating terminal equipment beforehand.

Specifically, in a case where a frame stipulated in CCITT Recommendation H. 221 is supposed as the communication frame, the multimedia multiplexing/demultiplexing and interterminal signal control unit 8 transfers FAS or BAS data within the frame to and from the control unit 26, audio data to and from the audio codec 12, video data in, e.g., a frame stipulated in CCITT Recommendation H. 261 to and from the picture codec 5, and data to-be-multiplexed/demultiplexed to and from the data multiplexor/demultiplexor 20. Besides, in a case where MLP data is contained in the frame stipulated in CCITT Recommendation H. 221, it is transferred between the control unit 8 and either the control unit 26 or the data multiplexor/demultiplexor 20 under the control of the control unit 26.

Herein, the data multiplexor/demultiplexor 20 demultiplexes the data to-be-demultiplexed into G3-FAX data, computer data, various control data, etc. in accordance with the protocols stipulated with the opposite communicating terminal equipment beforehand, and it delivers the demultiplexed data items to the G3-FAX modular jack 107, V11/RS422 multiconnector 106 and RS232C connector 105. Contrariwise, the data multiplexor/demultiplexor 20 multiplexes the data to-be-multiplexed delivered from the G3-FAX modular jack 107, V11/RS422 multiconnector 106 and RS232C connector 105 and delivers the multiplexed data items to the multimedia multiplexing/demultiplexing and interterminal signal control unit 8.

In the case of holding a multipoint teleconference, the multipoint conversation control 7 performs the controls required for the start and proceeding of the multipoint teleconference. In contrast, in the case of holding no multipoint teleconference, the control 7 merely relays data. The VDT 11 is a means for detecting the feed voltage of the pertinent terminal equipment.

The camera 1 picks up a picture, which is presented as a display output by the LCD 2. The VSW 4 is a video switch which changes-over the connection of the picture codec 5 with the camera 1, LCD 2 and video I/O interface 110. The video input/output of an external video I/O device can be connected with the video I/O interface 110.

The picture codec 5 codes a picture signal supplied through the VSW 4, and delivers the coded signal to the multimedia multiplexing/demultiplexing and interterminal signal control unit 8 through the multipoint conversation control 7. In addition, the picture codec 5 decodes the video data demultiplexed from the received communication frame by the control unit 8 and delivers an output through the VSW 4.

The hands-free set 14 is a microphone and a loudspeaker for freeing hands. The G3-FAX interface 16 is a modular jack to which a group 3 type facsimile can be connected. The audio input/output of an external audio I/O device can be connected to the audio I/O interface 109. An external microphone can be connected to the microphone input 108.

The ASW 13 is an audio switch which changes-over the connection of the audio codec 12 with the hands-free set 14, handset 15, G3-FAX interface 16, audio I/O interface 109 and microphone input 108.

The audio codec 12 codes a speech signal supplied through the ASW 4, and delivers the coded signal to the multimedia multiplexing/demultiplexing and interterminal signal control unit 8 through the multipoint conversation control 7. In addition, the audio codec 12 decodes the audio data demultiplexed from the received communication frame by the control unit 8 and delivers an output through the ASW 13. Incidentally, the audio codec 12 is connected to the V11/RS422 multiconnector 106 through the V11 D/R 17.

The dial function keys 3 are keys for accepting the instructions of a user. The telephone control man-machine interface 6 controls the ASW 13 in accordance with a key input from the dial function keys 3, so as to connect the audio codec 12 with the hands-free set 14, handset 15, G3-FAX interface 16, audio I/O interface 109 and microphone input 108. Besides, the instruction based on the key input is transferred to the multipoint conversation control 7 through the telephone control man-machine interface 6. In response to this instruction, the multipoint conversation control 7 controls the multipoint teleconference.

The G3-FAX interface 16 delivers a signal to-be-transmitted supplied from the G3 FAX (group 3 type facsimile) being an analog FAX connected to the G3-FAX connector 107, to the audio codec 12 through the ASW 13 in the case of treating the FAX data as audio data, while it digitizes the signal to-be-transmitted into a code and delivers the code to the data multiplexor/demultiplexor 20 in the case of treating the FAX data as data to-be-multiplexed. Contrariwise, when supplied with received data toward the G3 FAX by the audio codec 12, the G3-FAX interface 16 supplies the G3-FAX modular jack 107 with the received data as it is, and when supplied with received data toward the G3 FAX by the data multiplexor/demultiplexor 20, the G3-FAX interface 16 decodes the received data into an analog signal and delivers the analog signal to the G3-FAX modular jack 107.

The RS232C connector 105 serves as an RS232C interface, and it is a connector to which a computer, a word processor or an electronic blackboard can be connected. This RS232C connector 105 is connected to the control unit 26 or the data multiplexor/demultiplexor 20 through the bus SW 22. The communication interface matching section 21 matches the data rate of the input/output data of the data multiplexor/demultiplexor 20 with that of the input/output data of the RS232C interface 105. The communication ports 24 and 25 are ones which the control unit 26 uses in relation to the RS232C interface 105.

The V11/RS422 multiconnector 106 serves as a V11 interface and an RS422 interface, and it is a connector for connecting an external device. In this embodiment, an example in which a conference unit is connected will be described later.

The multiconnector 106 as the RS422 interface is connected to the control unit 26 through the bus SW 22. The communication port 23 is one which the control unit 26 uses in relation to the RS422 interface 106. The multiconnector 106 as the V11 interface is connected to the data multiplexor/demultiplexor 20.

In compliance with the commands of the control unit 26, the peripheral device control interfaces 27 and 28 control the various components in the teleconference terminal equipment, a mouse connected to the mouse jack 104, and a conferential console connected to the conference console connector 103. Also, they control an external device such as external camera through the camera control/external device multiconnector 101.

Incidentally, the camera control/external device multiconnector 101 transfers the command of the control unit 26 to the external device by means of the no-voltage contact 31.

The details of the picture codec 5 will be explained below.

Figure 2:
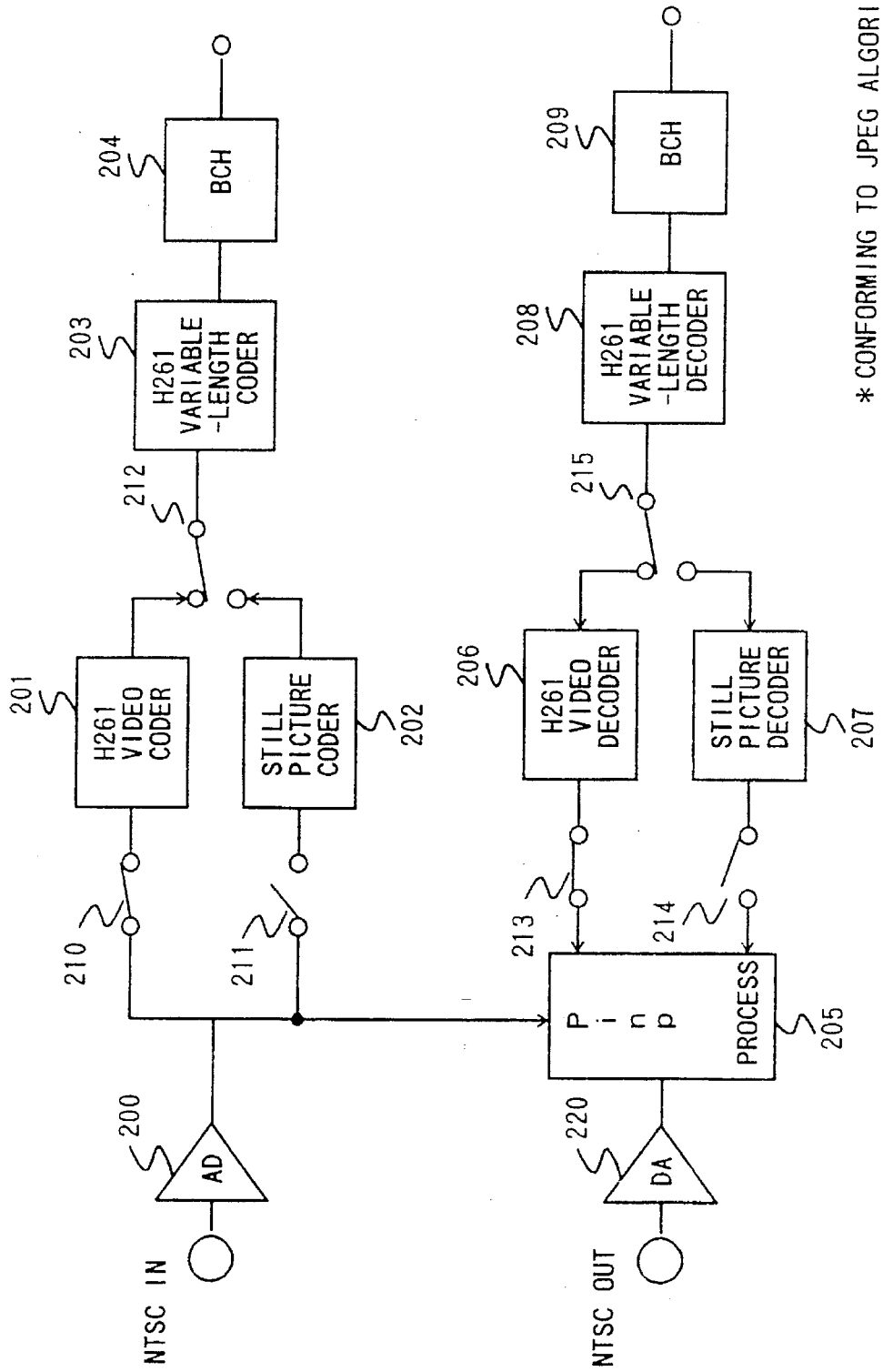
FIG. 2 is a block diagram showing the construction of a picture codec which is included in the teleconference terminal equipment of the first embodiment.

FIG. 2 illustrates the construction of the picture codec 5.

Referring to the figure, the picture codec 5 includes an A/D (analog-to-digital) converter 200, a video coder 201, a still picture coder 202, a variable-length coder 203, a BCH (Bose-Chaudhuri-Hocquenghem code unit) 204, a PinP (picture-in-picture) processor 205, a video decoder 206, a D/A (digital-to-analog) converter 220, a still picture decoder 207, a variable-length decoder 208, a BCH 209, and video switches 210, 211, 212, 213, 214 and 215.

Thus, in this embodiment, a still picture and a video are treated, but the signals thereof are digitized by the single A/D converter 200. This is based on the fact that the still picture and the video are not usually transmitted at the same time on account of the limited transmission capacity of a communication channel employed in a digital communications network. That is, in order to quickly send the still picture of large data quantity to the opposite communicating terminal equipment, the transmission of the video is usually suspended during that of the still picture.

Besides, in this embodiment, a still picture and a video which have been received are displayed in a multiplexed state within an identical frame through the PinP processor 205 to be detailed later, thereby making it more convenient for use. Moreover, the still and videos are multiplexed into the identical frame before analogizing the signals of the respective pictures, whereby the single D/A converter 220 suffices for turning the picture data of both the pictures into analog signals.

Next, the operation of the picture codec 5 will be explained.

When supplied with a picture signal through the VSW 4, the A/D converter 200 converts the picture signal into a digital signal. Incidentally, although an NTSC signal is assumed as the picture signal to-be-input in this embodiment, even a signal conforming to another standard such as PAL or RGB can be similarly processed. The digitized picture data is transferred to the PinP processor 205 as the picture data of the pertinent terminal equipment itself.

Under the control of the peripheral device control interface 27, the video switches 210 and 211 deliver the digitized picture data to either the video coder 201 or the still picture coder 202, depending upon whether the input picture signal is for a still picture or a video.

The video coder 201 codes the delivered picture data in accordance with code rules based on the DCT (discrete cosine transform) stipulated in CCITT Recommendation H. 261. Also, the still picture coder 202 codes the delivered picture data in accordance with predetermined code rules. When supplied with the coded picture data through the video switch 212 from either the video coder 201 or the still picture coder 202, the variable-length coder 203 turns the supplied image data into a variable-length code in accordance with variable-length code rules stipulated in CCITT Recommendation H. 261. When supplied with the variable-length code of the image data from the variable-length coder 203, the BCH 204 adds BCH data for error correction to the supplied code into video data and transfers the video data to the multimedia multiplexing/demultiplexing and interterminal signal control unit 8 through the multipoint conversation control 7.

On the other hand, when the BCH 209 is supplied with video data or still picture data through the multipoint conversation control 7 from the multimedia multiplexing/demultiplexing and interterminal signal control unit 8, it checks BCH data for error correction and delivers the error-corrected video data or still picture data to the variable-length decoder 208. This variable-length decoder 208 decodes the delivered picture data in accordance with the variable-length code rules stipulated in CCITT Recommendation H. 261. The data decoded by the variable-length decoder 208 is transferred to either the video decoder 206 or the still picture decoder 207 through the video switch 215, depending upon whether it is video data or still picture data. When supplied with the video data decoded by the variable-length decoder 208, the video decoder 206 decodes it in accordance with the code rules stipulated in CCITT Recommendation H. 261. Also, when supplied with the still picture data decoded by the variable-length decoder 208, the still picture decoder 207 decodes it in accordance with predetermined code rules such as code rules conforming to the JPEG algorithm of the ISO Standard. The picture data decoded by the video decoder 206 or the still picture decoder 207 is transferred as received motion picture data or received still picture data to the PinP processor 205 through the corresponding video switch 213 or 214.

If necessary, the PinP processor 205 performs a PinP process to be described later, by the use of the image data of the pertinent terminal equipment itself transferred from the A/D converter 200 and the image data decoded by the video decoder 206 or the still picture decoder 207, and it supplies the D/A converter 220 with the resulting image data which has been subjected to the PinP process. The D/A converter 220 converts the supplied image data into an analog signal, which is delivered to the video switch 4.

Then, the picture signal is presented as a display output on the LCD 2 or the like in accordance with the operation of the video switch 4.

Next, the details of the PinP processor 205 will be explained.

Figure 3:
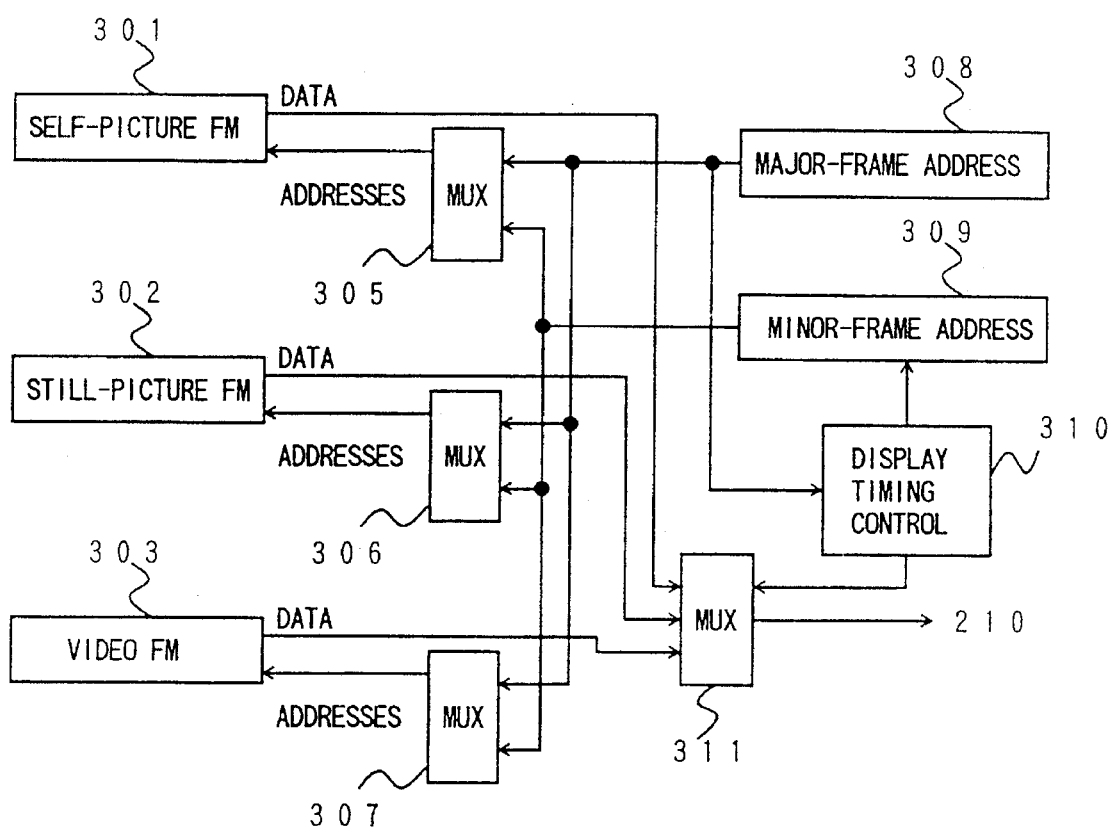
FIG. 3 is a block diagram showing the construction of a PinP (Picture in Picture) processor which is included in the teleconference terminal equipment of the first embodiment.

FIG. 3 illustrates the construction of the PinP processor 205.

Referring to the figure, the PinP processor 205 includes a self-picture frame memory 301, a still-picture frame memory 302, a motion-picture frame memory 303, MUX'es (multiplexors) 305, 306 and 307, a major-frame address generator 308, a minor-frame address generator 309, a display frame timing controller 310, and MUX 311.

Figure 4:
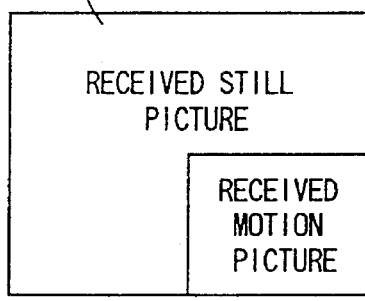
FIG. 4 is an explanatory diagram showing the aspects of a PinP process which is performed in the teleconference terminal equipment of the first embodiment.

Next, the PinP process which is performed by the PinP processor 205 will be explained with reference to FIG. 4.

The "PinP process" is a process for producing a picture-in-picture frame from a plurality of pictures. That is, it is a process for multiplexing and outputting two picture data in order that different output pictures may be displayed in a major frame area and a minor frame area as illustrated in FIG. 4.

In this embodiment, the two picture data are selected from among the three picture data of the self-picture data transferred from the A/D converter 200, the received still picture data transferred from the still picture decoder 207 and the received motion picture data transferred from the video decoder 206, and they are multiplexed and output so as to be displayed in the major and minor frame areas. In the case where, in this manner, the PinP process is carried out by selecting two from the three picture data of the self-picture data, received still picture data and received motion picture data, six types of picture-in-picture frames can be produced as shown at symbols (a)~(f) in FIG. 4.

The PinP process of the PinP processor 205 proceeds as stated below.

The self-picture frame memory 301 stores the transferred self-picture data therein. The still-picture frame memory 302 stores the received still picture data therein. The motion-picture frame memory 303 stores the received motion picture data therein. The contents of the individual frame memories are sequentially updated.

The major-frame address generator 308 generates addresses for fetching the data of a picture to be displayed in the major frame area, in display sequence from the frame memory in which the picture data are stored. While the major-frame address generator 308 is generating the data addresses of the above picture corresponding to the major frame area, the minor-frame address generator 309 generates in parallel with the address generation of the generator 308, addresses for fetching the data of a picture to be displayed in the minor frame area, in display sequence from the frame memory in which the picture data are stored. On this occasion, the address generation timings of the minor-frame address generator 309 are controlled by the display timing controller 310. Besides, the picture to be displayed in the minor frame area must be reduced in size as shown in FIG. 4. Therefore, the minor-frame address generator 309 generates skipped addresses in accordance with a reduction rate so as to thin out pixels and then fetch the picture data from the frame memory.

Herein, the addresses generated by the major-frame address generator 308 are afforded through the corresponding MUX 305, 306 or 307 to the frame memory 301, 302 or 303 in which the picture data to be displayed in the major frame area are stored. Likewise, the addresses generated by the minor-frame address generator 309 are afforded through the corresponding MUX 305, 306 or 307 to the frame memory 301, 302 or 303 in which the picture data to be displayed in the minor frame area are stored.

While the minor-frame address generator 309 is generating the aforementioned addresses corresponding to the minor frame area, the MUX 311 selects and delivers the picture data fetched from the frame memory in which the picture data to be displayed in the minor frame area are stored. At any other time, the MUX 311 selects and delivers the picture data fetched from the frame memory in which the picture data to be displayed in the major frame area are stored. A change-over timing for these operation modes of the MUX 311 is controlled by the display timing controller 310.

Incidentally, the frame memories of the PinP processor 205 may well be shared for frame memories which the video coder 201, still picture coder 202, video decoder 206 and still picture decoder 207 use for the coding and the decoding.

Next, the details of the G3-FAX interface 16 will be explained.

Figure 5:
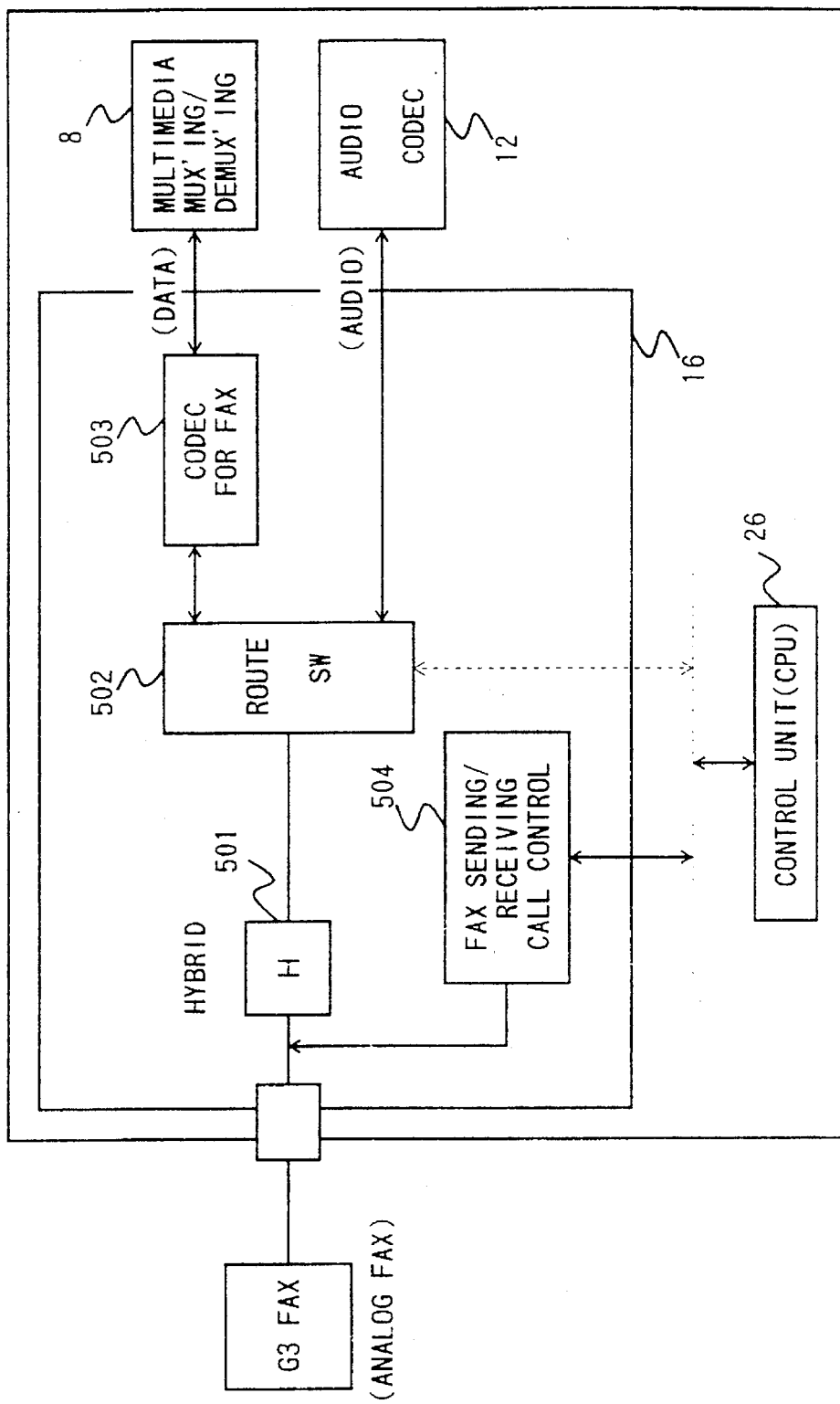
FIG. 5 is a block diagram showing the construction of a G3-FAX (group 3 type facsimile) interface which is included in the teleconference terminal equipment of the first embodiment.

FIG. 5 illustrates the construction of the G3-FAX interface 16.

Referring to the figure, the interface 16 includes a hybrid 501, a route SW (switch) 502, a codec 503 for the facsimile, and a FAX sending/receiving call control 504.

When the FAX sending/receiving call control 504 is informed of the reception of G3-FAX data through the peripheral device control interface 27 by the control unit 26, it applies a ringer signal to the G3-FAX modular jack 107. In addition, the FAX sending/receiving call control 504 detects the off-hook or on-hook condition of the G3 FAX connected with the G3-FAX modular jack 107 and reports the detected condition to the control unit 26 through the peripheral device control interface 27. Besides, if necessary, the control 504 reports the content of dialing in the G3 FAX connected with the G3-FAX modular jack 107, to the control unit 26 through the peripheral device control interface 27.

The hybrid 501 matches the half-duplex interface of the G3-FAX modular jack 107 with the full-duplex interface of the route SW side. In a case where the route SW 502 has been informed to the effect of treating the G3-FAX data as data to-be-multiplexed, through the peripheral device control interface 27 by the control unit 26, it connects the hybrid 501 to the audio codec 12. In consequence, the audio codec 12 codes the data sent by the connected G3 FAX and transfers the coded data as audio data to the multimedia multiplexing/demultiplexing and interterminal signal control unit 8 through the multipoint conversation control 7.

On the other hand, in a case where the route SW 502 has been informed to the effect of treating the G3-FAX data as audio data, through the peripheral device control interface 27 by the control unit 26, it connects the hybrid 501 to the codec 503 for the FAX. The FAX codec 503 codes the sent data of the connected G3 FAX in accordance with the μ/A rules, the ADPCM or the like, and transfers the coded data as data to-be-multiplexed to the multimedia multiplexing/demultiplexing and interterminal signal control unit 8 through the data multiplexor/demultiplexor 20.

In this manner, according to this embodiment, the ordinary G3 FAX can be connected to the teleconference terminal equipment and then used without altering the interface thereof. Furthermore, the G3-FAX data is coded using the FAX codec 503 and then treated as the data to-be-multiplexed, whereby a telephone conversation is possible with the audio codec 12 even during communications with the G3 FAX.

Next, the camera control/external device multiconnector 101 will be explained.

The teleconference terminal equipment according to this embodiment can have an external camera, an external monitor, an external microphone/external loudspeaker, etc. connected thereto by the video I/O interface 110, the audio I/O interface 109, the microphone input 108, etc.

The camera control/external device multiconnector 101 is a connector for controlling the external camera as well as illumination therefor, and the external microphone among the aforementioned external I/O devices. The control employing this multiconnector 101 is realized in such a way that the control unit 26 controls the no-voltage contact such as the relay contact 31 in compliance with an instruction from the dial function keys 3, an instruction from the console connected to the conference console connector 103, or control data received from the opposite communicating terminal equipment and transferred through the multimedia multiplexing/demultiplexing and interterminal signal control unit 8. Incidentally, in the case stated before where the frame stipulated in CCITT Recommendation H. 221 is presumed as the communication frame, the control unit 26 receives the control data in the form of the FAS, BAS or MLP data from the opposite communicating terminal equipment and controls the no-voltage contact 31 in accordance with the received control data.

Figure 6:
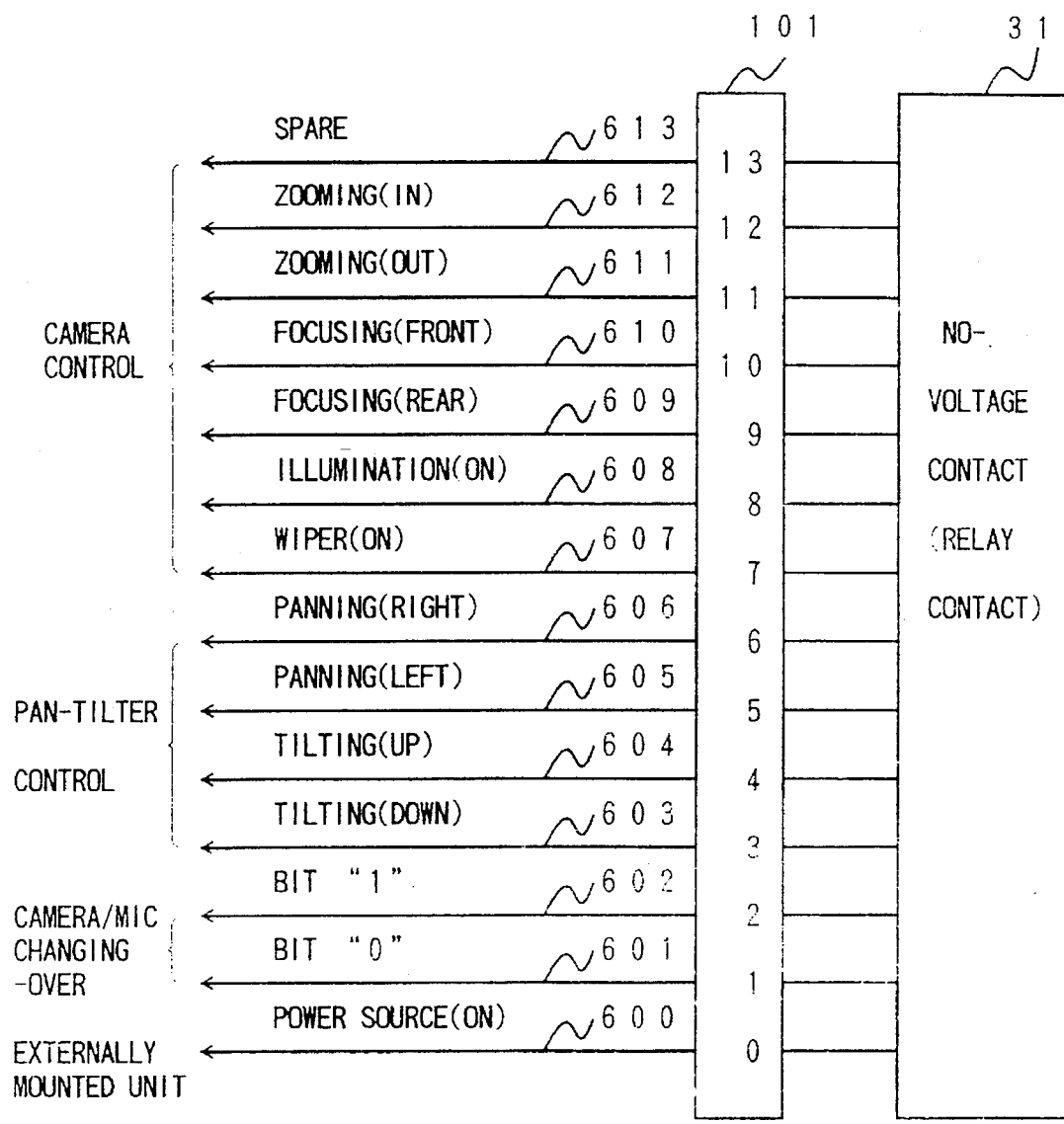
FIG. 6 is an explanatory diagram showing the construction of a camera control/external device multiconnector which is included in the teleconference terminal equipment of the first embodiment.

FIG. 6 illustrates the construction of the camera control/external device multiconnector 101. As shown in the figure, the multiconnector 101 contains the signals of spare 613; zooming 612, 611; focusing 610, 609; illumination 608; wiper 607; panning 606, 605; tilting 604, 603; camera/microphone changing-over 602, 601; and power source 600.

Using to these signals, the control unit 26 can control the zooming and focusing of the external camera, and the illumination, a wiper, and panning and tilting for the external camera, through the camera control/external device multiconnector 101. Also, it can control the change-over between the camera and the microphone, and the turn-ON/OFF of the power source of any desired external device through the multiconnector 101.

Next, the V11/RS422 multiconnector 106 will be explained.

The V11/RS422 multiconnector 106 is a connector which includes a V11 interface and an RS422 interface.

In this embodiment, it is assumed that the conference unit to be described later is connected to the V11/RS422 multiconnector 106.

The RS422 interface within the V11/RS422 multiconnector 106 is connected with the control unit 26 through the communication port 23. The control unit 26 transfers control data to and from the conference unit by the use of the RS422 interface.

The V11 interface within the V11/RS422 multiconnector 106 is connected to the data multiplexor/demultiplexor 20 and the audio codec 12. On the basis of the control of the control unit 26, the data multiplexor/demultiplexor 20 demultiplexes control data and data to-be-demultiplexed supplied from the multimedia multiplexing/demultiplexing and interterminal signal control unit 8, and it delivers the resulting data to the V11 interface. Contrariwise, the data multiplexor/demultiplexor 20 multiplexes control data and data to-be-multiplexed delivered from the V11 interface, with FAX data etc. delivered from the G3-FAX interface 16, and it supplies the resulting data to the multimedia multiplexing/demultiplexing and interterminal signal control unit 8. Incidentally, in the case of employing the aforementioned H. 221 frame as the communication frame, MPL data can be used as the control data.

Herein, the data which is delivered from the data multiplexor/demultiplexor 20 to the V11 interface is in the form of the actual burst data demultiplexed and extracted from the communication frame. Likewise, the data which is delivered from the V11 interface to the data multiplexor/demultiplexor 20 is burst data having the same transfer rate as that of data contained in the communication frame.

As stated above, in this embodiment, the data area and control data area of the communication frame can be opened to the exterior as they are. Accordingly, the V11 interface can freely utilize the predetermined data area or control data area contained in the communication frame.

Figure 7:
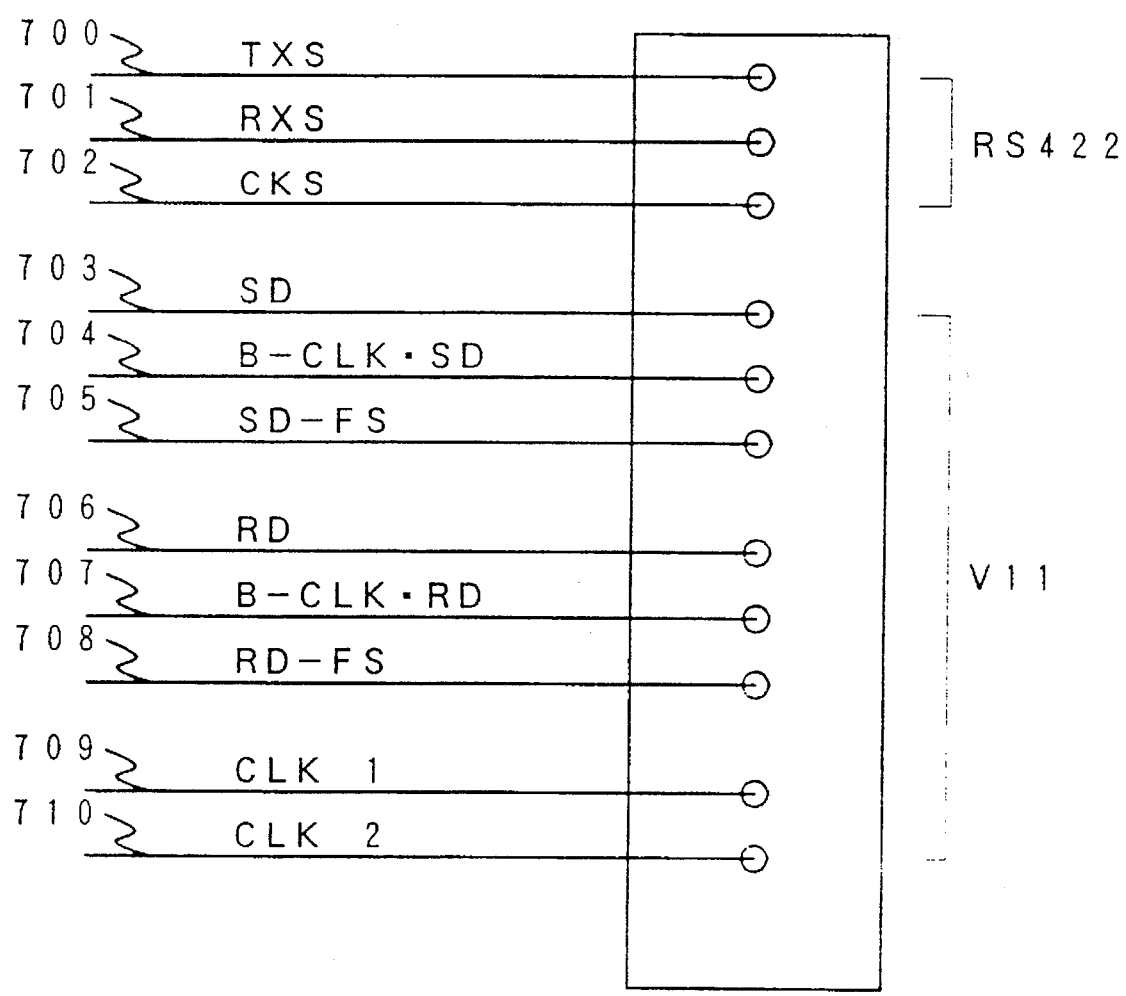
FIG. 7 is an explanatory diagram showing the construction of a V11/RS422 multiconnector which is included in the teleconference terminal equipment of the first embodiment.

Here, FIG. 7 illustrates the construction of the V11/RS422 multiconnector 106.

Referring to the figure, parts 700–702 constitute the RS422 interface, and parts 703–710 the V11 interface.

The RS422 interface includes the lines of transmission data 700, reception data 701 and a transfer clock 702. The V11 interface includes the lines of sending data 703, a sending burst clock 704 synchronized with sending burst data, a sending frame sink 705, receiving data 706, a receiving burst clock 707 synchronized with receiving burst data, a receiving flame sink 708, and two basic clocks 709, 710.

Next, the external appearance of the teleconference terminal equipment according to this embodiment are illustrated in FIGS. 8(a) and 8(b).

FIG. 8(a) is a perspective view of the terminal equipment seen obliquely from the front thereof, while FIG. 8(b) is a rear view of the essential portions thereof showing the arrangement of connectors.

Now, the constructions of teleconference systems each of which employs the teleconference terminal equipment according to this embodiment will be described with reference to FIG. 9 thru FIG. 13. In these figures, numeral 1000 indicates the teleconference terminal equipment.

Figure 9:
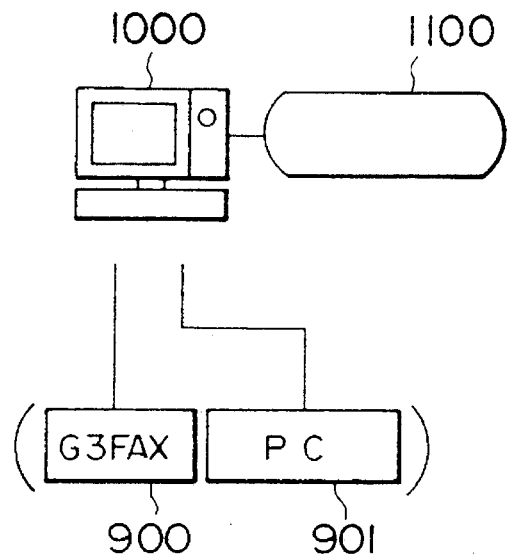
FIG. 9 is a block diagram showing an example of construction of a teleconference system according to the first embodiment of the present invention.
Figure 10:
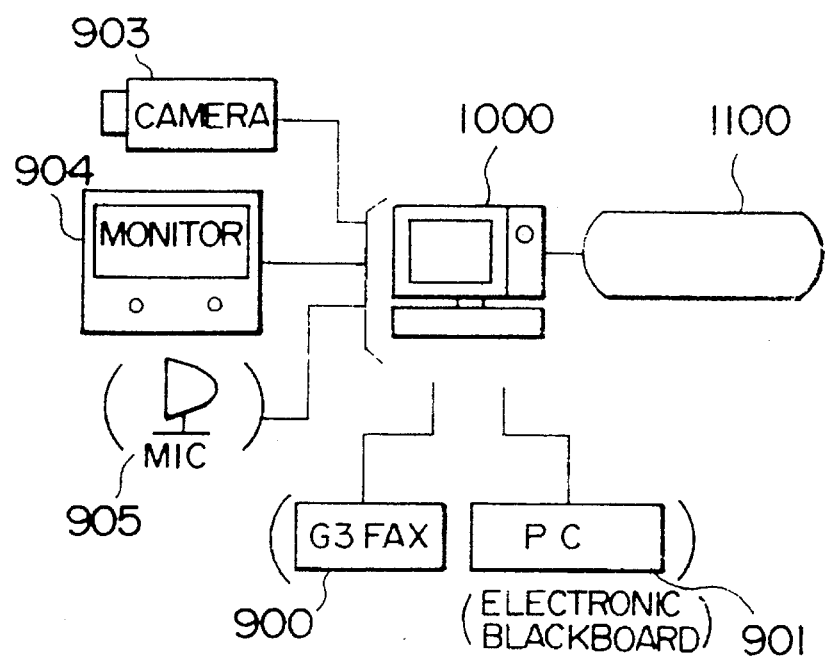
FIG. 10 is a block diagram showing another example of construction of the teleconference system of the first embodiment.
Figure 11:
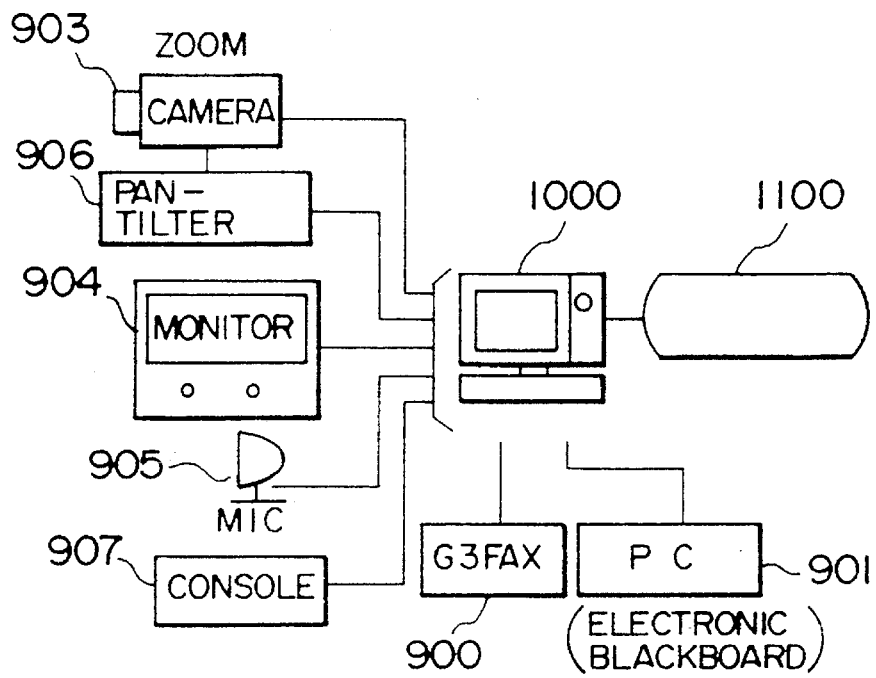
FIG. 11 is a block diagram showing still another example of construction of the teleconference system of the first embodiment.
Figure 12:
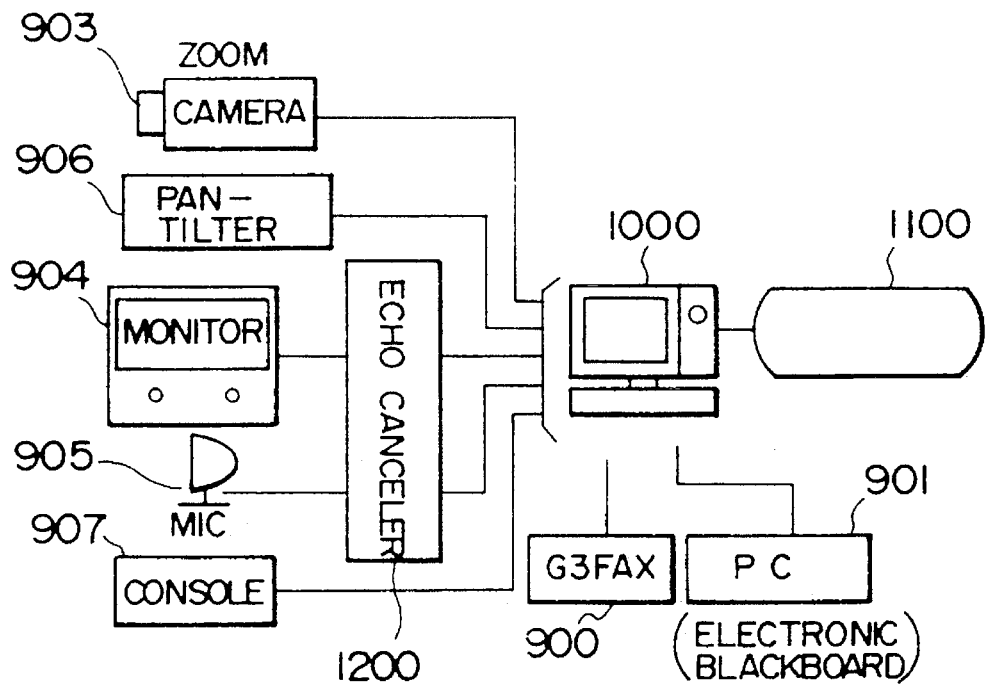
FIG. 12 is a block diagram showing yet another example of construction of the teleconference system of the first embodiment.
Figure 13:
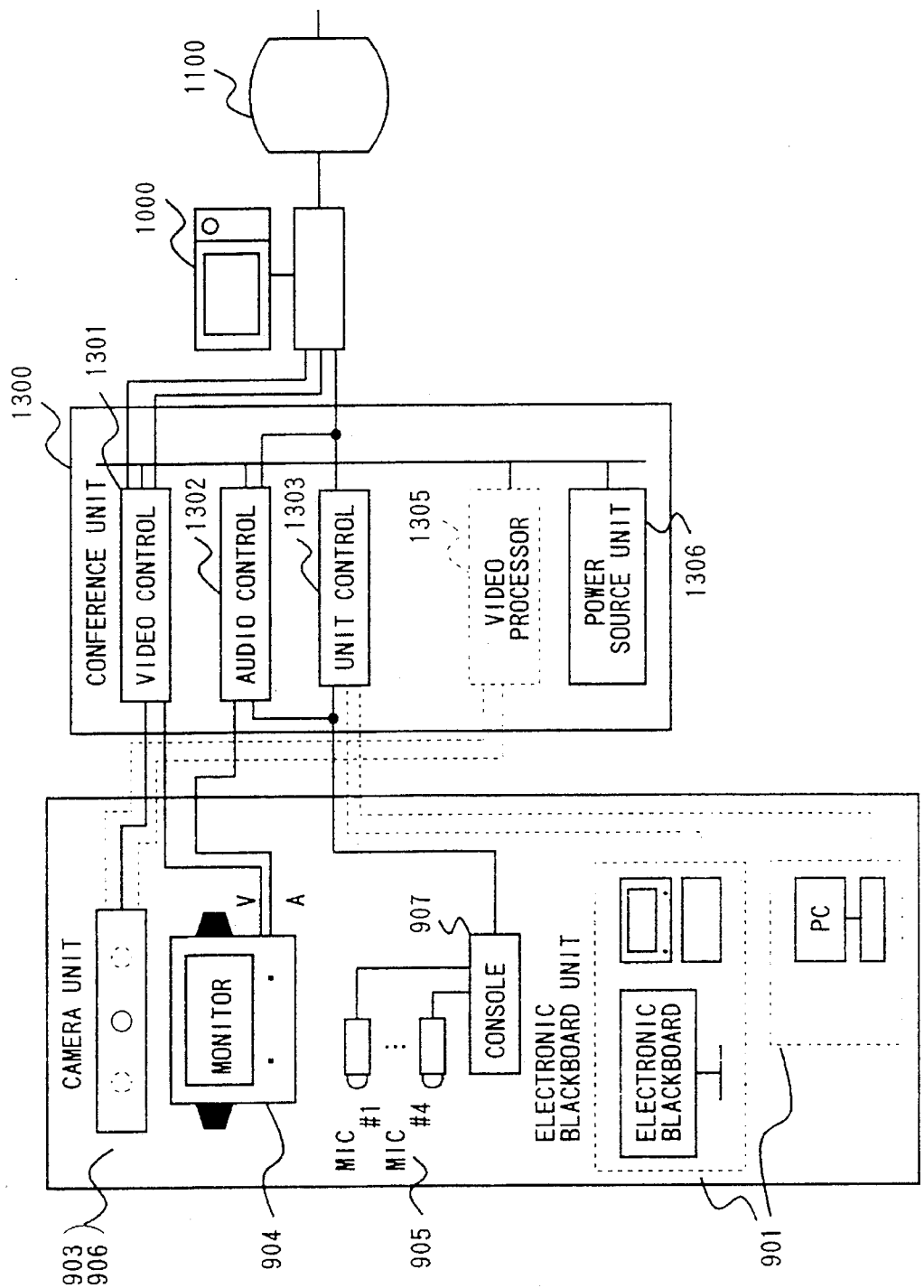
FIG. 13 is a block diagram showing a further example of construction of the teleconference system of the first embodiment.

FIG. 9 shows the teleconference system which is suitable for the personal telephonic communications between one person and another, FIG. 10 shows the teleconference system which is suitable for a teleconference among a small number of people, FIG. 11 shows the teleconference system of simplified type which is used for a teleconference, FIG. 12 shows the teleconference system which is suitable for a regular teleconference, and FIG. 13 shows the teleconference system which is suitable for a larger teleconference.

As seen from the figures, according to the teleconference systems in this embodiment, a G3 FAX 900, a computer 901 such as a personal computer or word processor, a camera 903, a monitor 904, a microphone 905, a camera pan-tilter 906, a conference console 907, etc. can be connected by the video I/O interface 110, audio I/O interface 109, microphone input 108, G3-FAX modular jack 107, V11/RS422 multiconnector 106, RS232C connector 105, mouse jack 104, conference console connector 103, and camera control/ external device multiconnector 101. Thus, the teleconference systems can be flexibly constructed in accordance with intended uses.

In particular, according to the teleconference system in this embodiment, the external interface based on the digital data of the audio codec 12 is included in the V11/R422 multiconnector 106 as stated before. As shown in FIG. 12, therefore, a digital echo canceler 1200 of high performance can be disposed outside if it is need.

As shown in FIG. 13, a G3 FAX 900, data processing devices 901 such as a personal computer or word processor and an electronic blackboard, a camera 903, a monitor 904, microphones 905, a camera pan-tilter 906, a conference console 907, etc. may well be connected through a conference unit 1300 so as to realize higher degrees of conference functions.

As shown in FIG. 13, the conference unit 1300 includes a video controller 1301, an audio controller 1302, a unit controller 1303, a video processor 1305 and a power source unit 1306. The video controller 1301 is connected to the video I/O interface 110 of the teleconference system. The audio controller 1302, unit controller 1303 and video processor 1305 are connected with the V11/RS422 multiconnector 106 of the teleconference system through the unshown data interface unit thereof.

The unit controller 1303 controls any of the constituents of the conference unit 1300 in compliance with an instruction from the conference console 907, an instruction from the control unit 26 of the teleconference system as delivered through the RS422 interface, or control data received through the V11 interface from the opposite communicating terminal equipment. In addition, the unit controller 1303 transfers data received through the V11 interface from the opposite communicating terminal equipment, between this V11 interface and the data processing devices 901 such as the personal computer or word processor and the electronic blackboard.

The video controller 1301 and the still picture processor control the change-over between, for example, the camera and the monitor which are connected to the video I/O interface 110 of the teleconference system. The audio controller 1302 controls the change-over between, for example, the microphone and the loudspeaker which are connected to the audio codec 12 of the teleconference system through the V11 interface. In addition, the audio controller 1302 performs an echo canceling process as may be needed. The video processor 1305 performs the control of the camera pan-tilter 906.

In this manner, according to the teleconference system of this embodiment, the pertinent terminal equipment can communicate with the conference unit connected to the opposite terminal equipment through the mutual direct controls which are performed as needed by the use of the data area and the control data area opened to the external devices as stated before, and the intended uses of teleconference systems can be flexibly coped with.

Now, the second embodiment of a teleconference system according to the present invention will be described.

Figure 14:
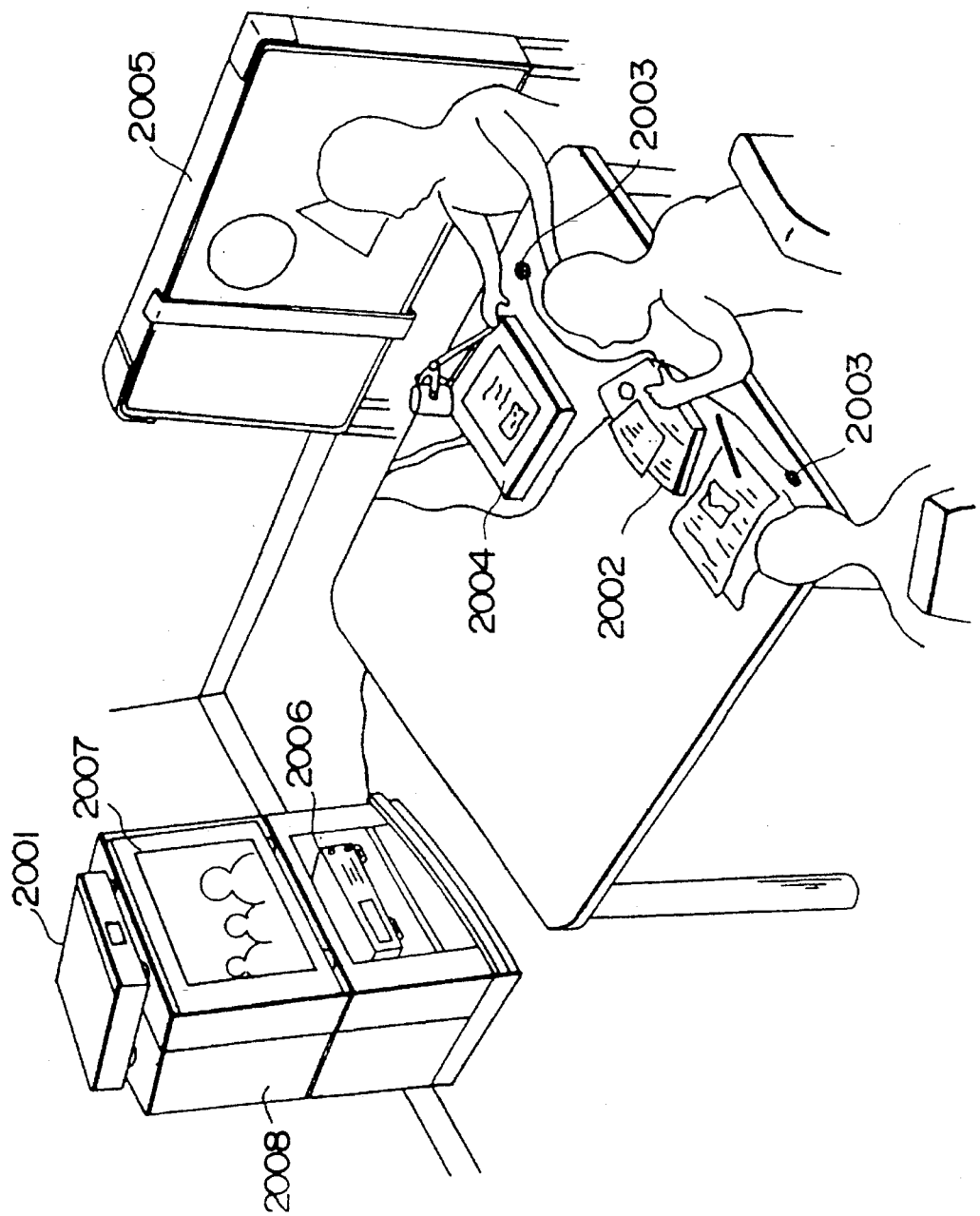
FIG. 14 is an explanatory view showing the construction and service situation of a teleconference system according to the second embodiment of the present invention.

First, FIG. 14 illustrates the construction of the teleconference system according to this embodiment.

Referring to the figure, the embodiment includes a teleconference module 2001 connected to a digital communications network, a control keyboard 2002, microphones 2003, a document photographing stand 2004, an electronic blackboard 2005, a video tape recorder 2006, a display unit 2007 and a display unit rack 2008 for housing the display unit 2007 therein. In this embodiment, the display unit 2007 shall be explained as being a CRT display device which has a built-in loudspeaker.

The illustrated teleconference system is fundamentally configured of the teleconference module 2001, the display unit 2007 connected to the teleconference module 2001, the control keyboard 2002 connected to the teleconference module 2001, and the microphones 2003 connected to the teleconference module 2001 through the control keyboard 2002. If necessary, the system is expanded by connecting the document photographing stand 2004, electronic blackboard 2005 and video tape recorder 2006 to the teleconference module 2001. In addition, as will be described later, an external camera, a facsimile machine and a small-sized computer can be connected to the teleconference module 2001 if it is need.

As shown in the figure, the teleconference system of this embodiment features the teleconference module 2001 in the shape of a box. By connecting this teleconference module 2001, the control keyboard 2002 and the microphones 2003, a teleconference can be held in any of a conference room, a living room, etc. where ordinary display units are installed.

The teleconference module 2001 has a built-in camera, and it has geometries such that it can be put on the top plate of the rack 2008 housing the display unit 2007 therein or put directly on the display unit 2007. The teleconference module 2001 codes an image picked up over the top plate of the rack 2008 or over the display unit 2007 by the built-in camera, and transmits the resulting code to the opposite communicating side through the connected digital communications network. Also, it decodes the image of the opposite side received through the digital communications network and then transfers the resulting image to the display unit 2007.

The teleconference module 2001 will be explained.

Figure 15:
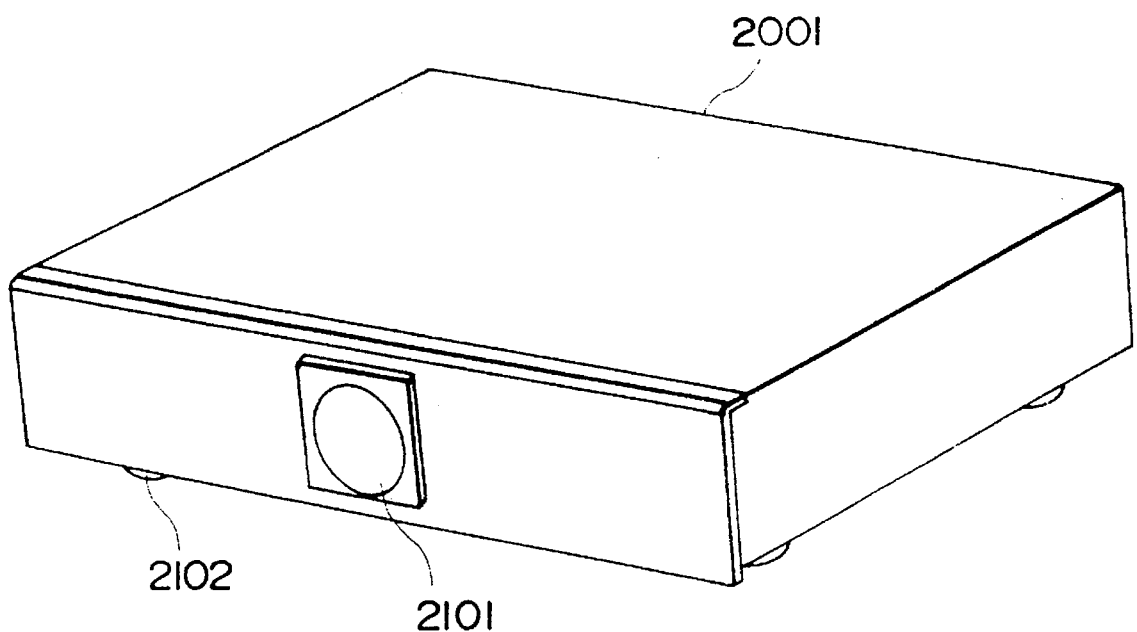
FIG. 15 is an exterior view showing the construction of a teleconference module according to the second embodiment of the present invention.

FIG. 15 illustrates the external appearance of the teleconference module 2001 according to this embodiment.

As shown in the figure, this teleconference module is a box-like one similar to common video tape recorders, BS (broadcasting by satellite) tuners, etc. In the illustration, numeral 2101 designates a camera window, behind which the built-in camera is mounted. Besides, numeral 2102 designates a rotary volume control for adjusting the sensitivity of each microphone 2003. Various terminals are mounted on the rear surface of the teleconference module 2001.

Next, FIGS. 16(a), 16(b) and 16(c) are a front view, a side view and a rear view of the teleconference module 2001, respectively.

As shown in the rear view of FIG. 16(c), the rear surface of the teleconference module 2001 is provided with two video signal input terminals 2816 and 2825, two video signal output terminals 2817 and 2824, an audio signal input terminal 2819, audio signal output terminals 2818 and 2823, a modular jack 2820 for a G3 FAX (group 3 type facsimile), a modular jack 2830 for the digital communications network, an RS232C connector 2821, a connector 2822 for the control keyboard 2002, a triple-pole terminal 2311 for connecting a power source cable, and a seesaw switch 2312 being a power switch.

In addition, four supporters 2320 furnished with adjusting mechanisms are provided for adjusting the spacings between the body 2310 and the installation plane of the teleconference module 2001 independently of one another. Thus, the inclination of the body 2310 as well as the camera included therein can be adjusted.

Figure 17A:
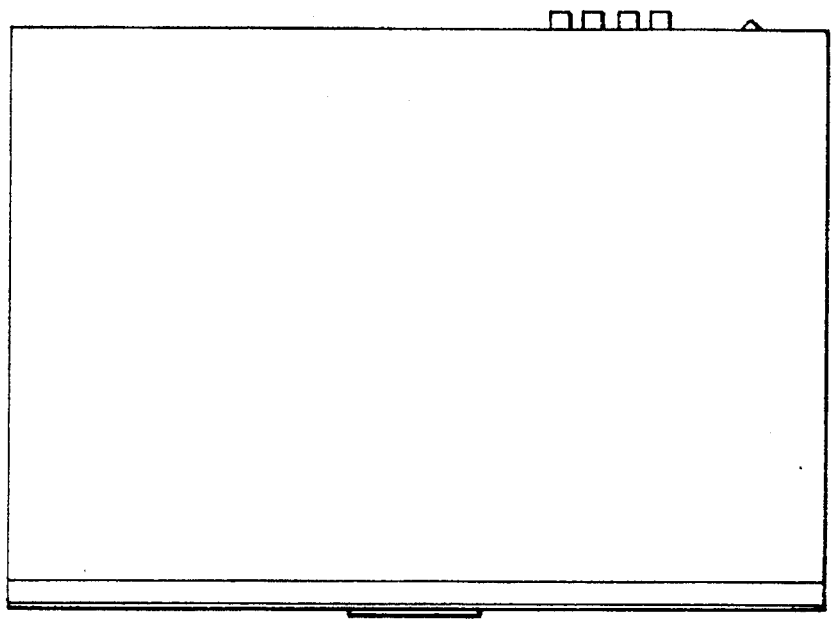
FIGS. 17(a) and 17(b) are a plan view and a bottom view of the teleconference module of the second embodiment, respectively.
Figure 17B:
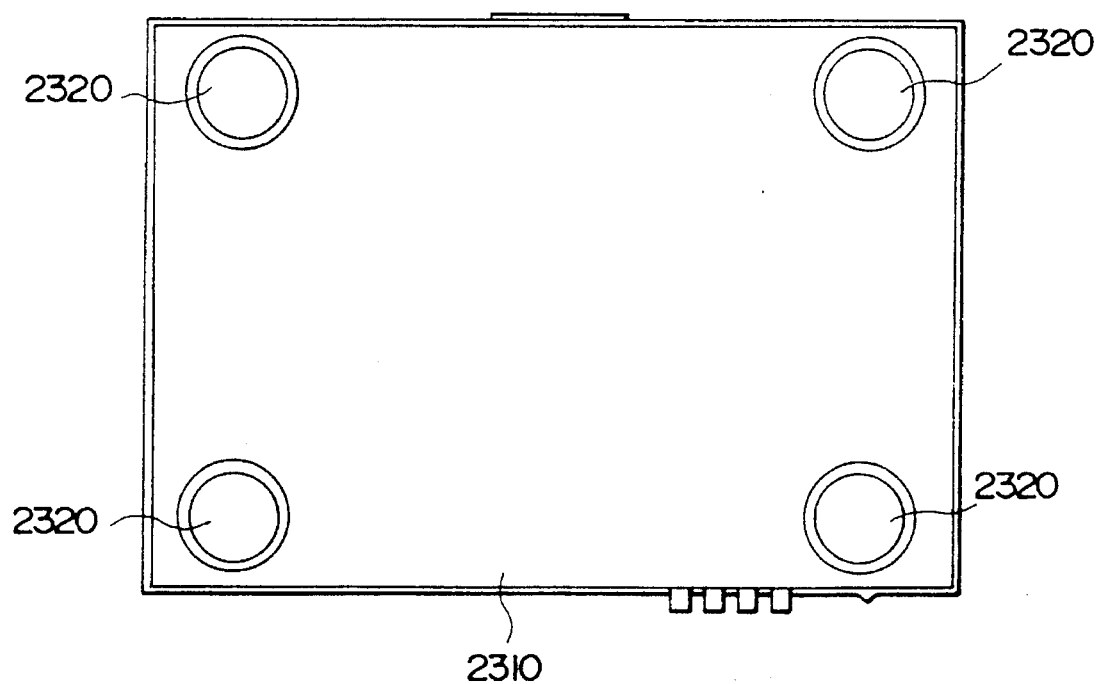

Further, FIGS. 17(a) and 17(b) are a plan view and a bottom view of the teleconference module 2001, respectively.

Next, the internal construction of the teleconference module 2001 will be explained.

Figure 18:
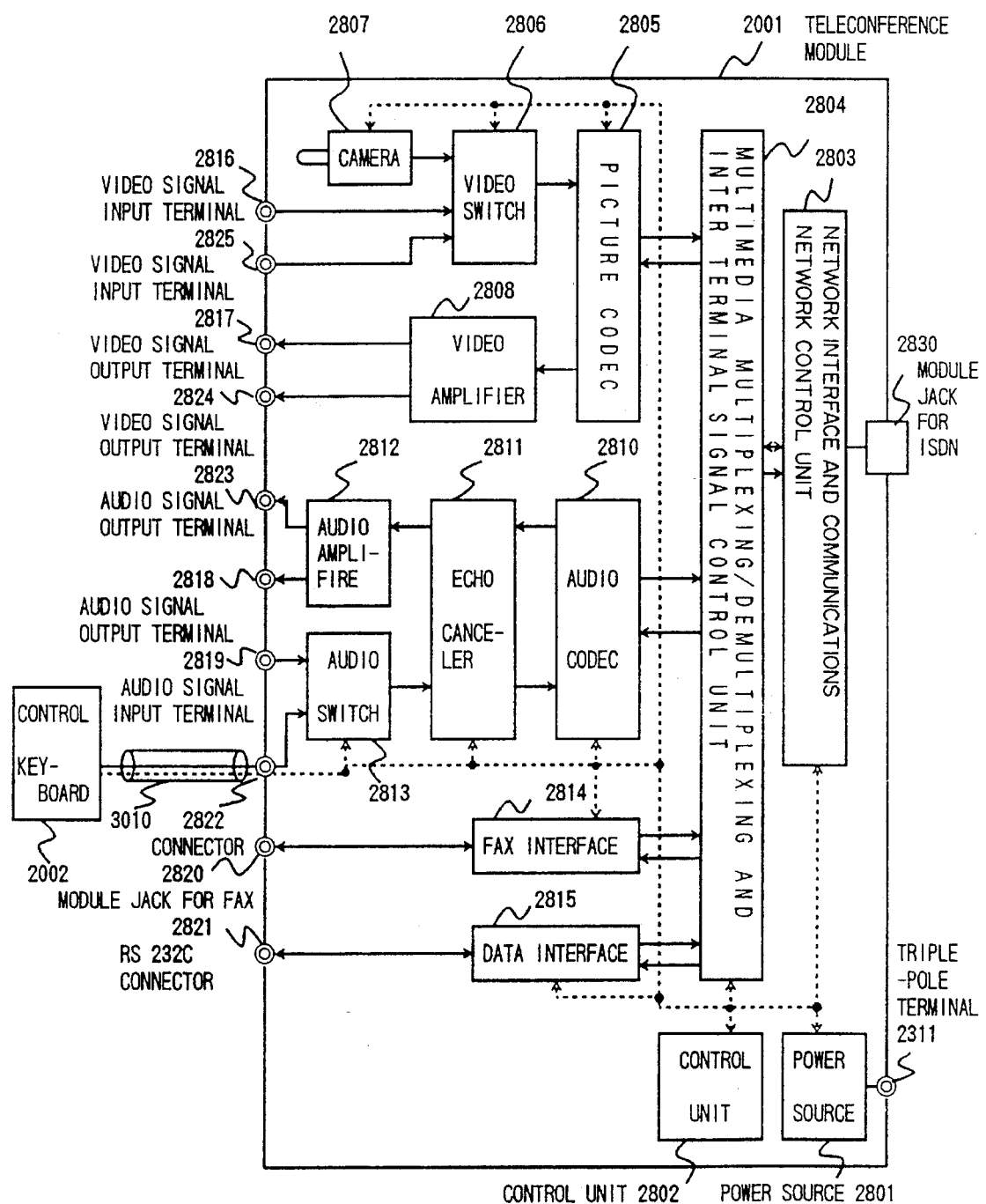
FIG. 18 is a block diagram showing the circuit arrangement of the teleconference module of the second embodiment.

FIG. 18 shows the internal construction of this teleconference module.

Referring to the figure, numeral 2830 indicates the terminal which is to be connected to the digital communications network. In this embodiment, the digital communications network is assumed to be the ISDN (integrated service digital network), and the terminal 2830 to be a modular jack having eight pins. Besides, the teleconference module 2001 includes the camera 2807, a video switch 2806, a video amplifier 2808, a picture codec 2805, a multimedia multiplexing/demultiplexing and interterminal signal control unit 2804, a network interface and communications network control unit 2803, a audio codec 2810, an echo canceler 2811, an audio switch 2813, an audio amplifier 2812, a FAX interface 2814, a data interface 2815, a control unit 2802 and a power source 2801.

As mentioned before, the external I/O terminals are the two video signal input terminals 2816 and 2825, the two video signal output terminals 2817 and 2824, the audio signal input terminal 2819, the audio signal output terminals 2818 and 2823, the modular jack 2820 for the G3 FAX, the RS232C connector 2821, the connector 2822 for the control keyboard 2002, the triple-pole terminal 2311 for connecting the power source cable, and the connector 2822 for the control keyboard 2002. These connectors and the above terminal 2803 are arranged on the rear surface of the teleconference module 2001 as stated before.

Herein, the network interface and communications network control unit 2803 is connected to the ISDN through the connector 2830, and it performs the communication controls and communication processing between the pertinent teleconference terminal equipment and the network, such as establishing a communication channel with the opposite communicating terminal equipment. The multimedia multiplexing/demultiplexing and interterminal signal control unit 2804 performs various controls between the pertinent terminal equipment and the opposite terminal equipment. Besides, this control unit 2804 demultiplexes video data, audio data, data to be multiplexed/demultiplexed, control data, etc. from within a received communication frame into the individual data types, and it multiplexes such types of data into a transmission communication frame. The video data mentioned above is interface data on the network side of the picture codec 2805, while the audio data is interface data on the network side of the audio codec 2810. The data to be multiplexed/demultiplexed is interface data with respect to the data interface 2815 and the FAX interface 2814. The control data is transferred between the control unit 2804 and the control unit 2802.

The multimedia multiplexing/demultiplexing and interterminal signal control unit 2804 further demultiplexes the data demultiplexed from within the received communication frame, into G3-FAX data, computer data, various control data, etc. In accordance with protocols stipulated with the opposite transmission terminal equipment beforehand, and it delivers these data to the G3-FAX modular jack 2820 and RS232C connector 2821 through the FAX interface 2814 and data interface 2815, respectively.

Conversely, the control unit 2804 accepts data to be transmitted in a multiplexed state, from the G3-FAX modular jack 2820 and RS232C connector 2821.

The camera 2807 picks up an image. The video switch 2806 supplies the picture codec 2805 with an input from the video signal input terminal 2816, instead of an input from the camera 2807. Thus, the document photographing stand 2004 and the external camera can be connected to the video input terminals 2816 and 2825. Accordingly, when the external camera for photographing conferees is substituted for the built-in camera 2807, it can be used in the state in which it is housed in the display unit rack 2008.

The picture codec 2805 codes an input picture signal, and delivers the resulting coded signal to the multimedia multiplexing/demultiplexing and interterminal signal control unit 2804. In addition, it decodes video data demultiplexed from within a received communication frame by the control unit 2804 and then delivers the resulting decoded data to the video signal output terminals 2817 and 2824 through the video amplifier 2808. The video signal output terminal 2824 is connected with the external video input terminal of the display unit 2007 so as to display a received picture. On the other hand, the video signal output terminal 2817 is connected with the external video input terminal of the video tape recorder 2006 so as to record the contents of the teleconference as and when required.

The audio input and output terminals 2818, 2819 and 2823 can have the audio input and outputs of external audio devices connected thereto. The audio switch 2813 is one by which any of an input from the G3 FAX connected to the G3-FAX modular jack 2820, an input from a device connected to the audio input interface 2819, and an input from the microphones 2003 coupled with the control keyboard 2002 connected to the connector 2822 is transferred to the audio codec 2810 through the echo canceler 2811.

The audio codec 2810 codes an input speech signal, and delivers the resulting coded signal to the multimedia multiplexing/demultiplexing and interterminal signal control unit 2804. In addition, it decodes audio data demultiplexed from within a received communication frame by the control unit 2804 and then delivers the resulting decoded data to the audio output terminals 2818 and 2823 through the echo canceler 2811 as well as the audio amplifier 2812. The audio output terminal 2818 has the external audio input terminal of the video tape recorder 2006 connected thereto, while the audio output terminal 2823 has the external audio input terminal of the display unit 2007.

The echo canoelet 2811 performs an echo canceling process between the speech signal decoded from the audio data and the speech signal delivered from the audio switch 2813, thereby preventing the occurrence of howling during communications. Incidentally, the howling may well be prevented by replacing the echo canceler 2811 with an echo suppressor which suppresses a selected one of the outputs to the audio amplifier 2812 and the input from the audio switch 2813.

The FAX interface 2814 delivers a signal to-be-transmitted supplied from the G3 FAX being an analog FAX connected to the G3-FAX modular jack 2820, to the audio codec 2810 in the case of treating the FAX data as audio data, while it digitizes the signal to-be-transmitted into a code and delivers the code to the multimedia multiplexing/demultiplexing and interterminal signal control unit 2804 in the case of treating the FAX data as data to-be-multiplexed. Contrariwise, when supplied with received data toward the G3 FAX by the audio codec 2810, the FAX interface 2814 supplies the G3-FAX modular jack 2820 with the received data as it is, and when supplied with received data toward the G3 FAX by the multimedia multiplexing/demultiplexing and interterminal signal control unit 2804, the FAX interface 2814 decodes the received data into an analog signal and delivers the analog signal to the G3-FAX modular jack 2820.

The RS232C connector 2821 serves as an RS232C interface, and it is a connector to which a computer, a word processor or an electronic blackboard can be connected. This RS232C connector 2821 is connected to the control unit 2802 or the multimedia multiplexing/demultiplexing and interterminal signal control unit 2804 through the data interface 2815.

The control unit 2802 performs serial data communications with the control keyboard 2002. Besides, it performs various controls for the constituents of the teleconference module 2001, for example, the display control of a menu picture to be described later, on the basis of data transferred from the multimedia multiplexing/demultiplexing and interterminal signal control unit 2804 and data transferred from the control keyboard 2002.

The external device interfaces of the teleconference module 2001 will be put in order in Table 1 below:

TABLE 1

| Items | Contents | | |
|---|---|---|---|
| External Inputs and Outputs | | | |
| Video Inputs | 2 | 75 Ω | 1 Vp-p |
| Video Outputs | 2 | Unbalance | RCA pin jacks |
| Audio Input | 1 | Above 40 kΩ | 312 mVrms |
| Audio Outputs | 2 | Below 2 kΩ | RCA pin jacks |
| FAX Interface | 1 | Connecting G3 FAX | |
| Data Interface | 1 | RS232C, 1.2–9.6 kb/s | |

Meanwhile, the picture codec 2805 codes and decodes pictures in conformity with algorithms stipulated in CCITT Standard, H. 261. In this regard, a picture codec is implemented with two circuit boards each having a size nearly equal to the A5-format in, for example, a commercially-available video telephone set HV-100 (trade name) manufactured by Hitachi, Ltd. In the future, such picture codecs will be increasingly reduced in size by applying highly-packaged circuit technology.

FIGS. 19(*a*), 19(*b*) and 19(*c*) are a schematic plan view, a schematic side view and a schematic front view, respectively, showing the internal structure of the teleconference module 2001.

As can be seen from the figures, the teleconference module 2001 is configured of the camera 2807 and six circuit boards 2601–2606.

Referring to the figures, numeral 2310 indicates the body of this teleconference module, and numeral 2320 each supporter furnished with the adjusting mechanism. The six circuit boards 2601–2606 are mounted inside the body 2310 as depicted in the figures.

The circuit boards 2601 and 2602 are ones on which the picture codec 2805 is installed, and each of which has nearly the same size as the A5-format in the video telephone set HV-100. The circuit board 2603 is one which carries the multimedia multiplexing/demultiplexing and interterminal signal control unit 2804, network interface and communications network control unit 2803, audio codec 2810, echo canceler 2811, FAX interface 2814, data interface 2815, control unit 2802, video switch 2806 and video amplifier 2808. The circuit board 2604 carries the echo canceler 2811, audio amplifier 2812 and audio switch 2813. The circuit boards 2605 and 2606 carry the power source 2801.

In this manner, the picture codec 2805 is configured of the two circuit boards each having the A5-size approximately, whereby the teleconference module 2001 can be realized as the box-shaped module whose size is substantially equal to the size of, e.g., an ordinary video tape recorder for domestic use. In this embodiment, the size of each of the circuit boards 2601 and 2602 is 168 mm×184 mm, that of the circuit board 2603 is 256 mm×210 mm, that of the circuit board 2604 is 140 mm×260 mm, that of the circuit board 2605 is 156 mm×116 mm, and that of the circuit board 2606 is 227 mm×88 mm. The body 2310 of the teleconference module 2001 is 431 mm wide, 82 mm high and 300 mm deep.

Incidentally, since dedicated LSI's being commercially available can be employed as the circuits of the echo canceler 2811, audio codec 2810, network interface 2803, etc., the teleconference module 2001 can be satisfactorily constructed using the circuit boards 2603, 2604, 2605 and 2606 of the aforementioned sizes.

If the teleconference module 2001 has the dimensions of a height within 150 mm, a width within 500 mm and a depth within 450 mm, it can be used without hindrance in the state in which it is placed on the display unit rack 2008 or the display unit 2007 as shown in FIG. 14. In addition, it can be housed in the rack 2008 without hindrance.

Figure 20:
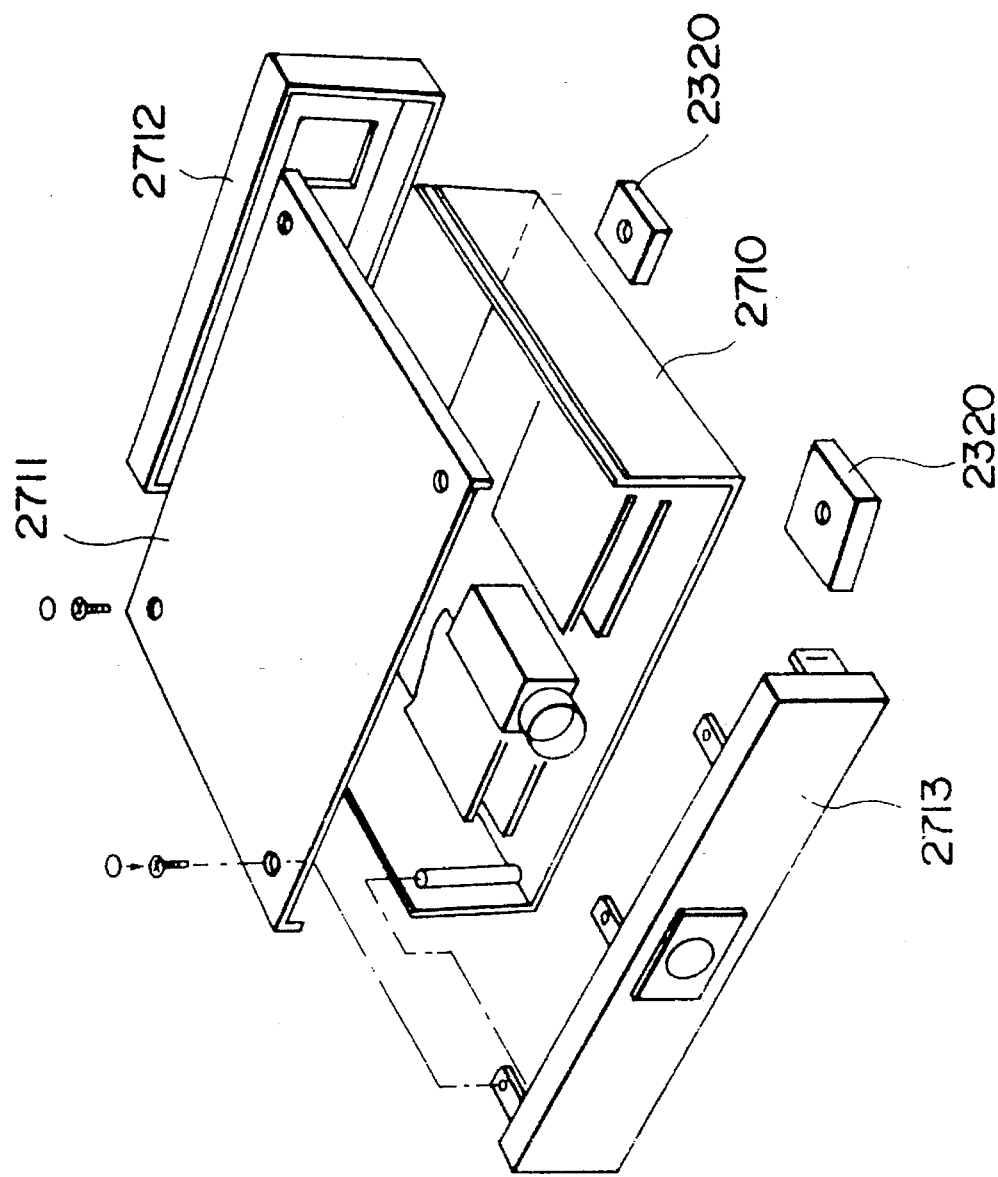
FIG. 20 is an exploded perspective view showing the state of the assemblage of the teleconference module of the second embodiment.

Next, FIG. 20 illustrates the situation of the assemblage of the teleconference module 2001.

As shown in the figure, the teleconference module 2001 is assembled in such a way that a top panel 2711, a front panel 2712, a back panel 2713 and the adjustable supports 2320 are attached to a body base 2710 on which the camera 2807 and the circuit boards 2601–2606 are mounted.

Next, the control keyboard 2002 will be explained.

Figure 21:
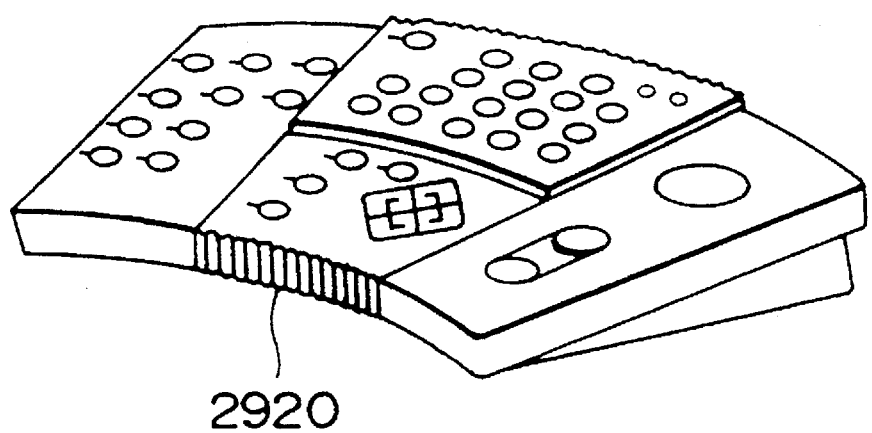
FIG. 21 is a perspective view showing the external construction of a control keyboard according to the second embodiment of the present invention.

FIG. 21 shows the external appearance of the control keyboard 2002. As shown in the figure, the control keyboard 2002 is in the shape of a sector. Various keys are arranged on the upper surface of this control keyboard, while terminals 2910 for connecting microphones and also terminals for cables for connections with the teleconference module 2001 are disposed on the rear surface. Besides, a built-in microphone 2920 is arranged in the front of this control keyboard.

The key arrangement on the upper surface of the control keyboard 2002 is illustrated in FIG. 22, and functions which are designated by the keys will be listed in Tables 2 and 3 below:

TABLE 2

| Names | Outlines of Functions |
|---|---|
| START | Transmit func: dialing. |
| | Preset func: Input-acknowledging dial. |
| REDIAL | Retransmitting to last called address. |
| SPD DIAL | Speedy dialing to registered No. by designating the No. |
| MUTE | Turning off transmission speech, and transmitting mute. |
| CANCEL | Deleting last input letter. (Also, ending help.) |
| COM | Alternating HOOK states. |
| MENU | Registering, setting and acknowledging TEL directory, operation modes, etc. |
| VIDEO | Non-com. period: Changing-over Auto/Manual picture sending. |
| | Com. period: Requesting for manual picture sending. |
| MON/PIP | Monitor-displaying transmission picture (coded picture) on Whole screen/Minor screen. |
| FREEZE | Freezing input of transmission picture. |
| AUDIO SRC | Changing-over transmission speech between handset input and external speech input. |
| VIDEO SRC | Changing-over transmission picture between accessory camera input and external video input. |
| HELP | Displaying help information on function keys, etc. |
| FAX | Connecting FAX and TEL circuit for transmission/reception. |

TABLE 2-continued

| Names | Outlines of Functions |
|---|---|
| DATA | Turning ON/OFF RS232C port for data com. between both terminal equipments. |
| TELE ↑ | Zooming out built-in camera. (Hard) |
| WIDE ↓ | Zooming in built-in camera. (Hard) |
| VOL ↑ | Increasing sound volume of loudspeaker. (Hard) |
| VOL ↓ | Decreasing sound volume of loudspeaker. (Hard) |

TABLE 3

| Names | Outlines of Functions |
|---|---|
| CURSOR ↑ | Spare, tilt ↑. |
| CURSOR ↓ | Spare, tilt ↓. |
| CURSOR → | Spare, pan →. |
| CURSOR ← | Spare, pan ←. |
| PIC Q SEL | Changing-over quality of transmission picture in 3 stages (STD/FAST/DETAIL). |
| HS | Changing-over loudspeaker and handset. |
| LOC/RMT | Changing-over LOCAL/REMOTE for panning, tilting, zooming or focusing control. |

Typical keys will be explained with reference to FIG. 22. Numeral 2901 indicates a volume control for controlling the sound volume of a loudspeaker 2104 built into the teleconference module 2001. Numeral 2902 indicates keys for controlling the zooming functions of the camera 2807. Denoted by numeral 2903 are numerical and function keys which serve to control the communication functions of the teleconference module 2001, and which are equivalent to those of an ISDN terminal equipment. In this embodiment, however, the numerical keys are shared with alpha keys. Keys 2904 serve to control a pan-tiller which is sometimes installed for the camera 2807 of the teleconference module 2001. Besides, keys 2905 serve to change-over the picture qualities of pictures to-be-transmitted, a key 2906 serves to change-over the input of the built-in camera 2907 of the teleconference module 2001 and the input of the external camera set on, e.g., the document photographing stand 2004 as a transmission picture, and keys 2907 and 2908 serve to change-over transmission data from video or audio data to input data from the facsimile machine and small-sized computer connected to the teleconference module 2001, respectively. Further, indicators, such as an LED 2909 for indicating the closure of power supply, are provided on the upper surface of the control keyboard 2002.

Figure 23A:
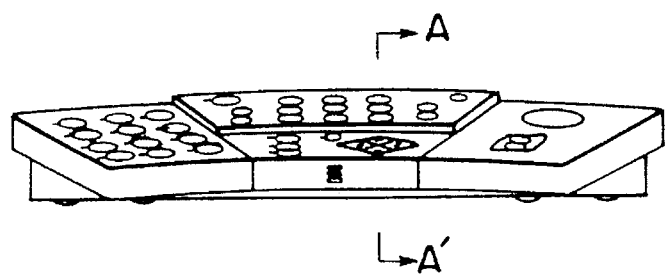
FIGS. 23(a), 23(b) and 23(c) are a front view, a plan view and a bottom view of the control keyboard of the second embodiment, respectively.
Figure 23B:
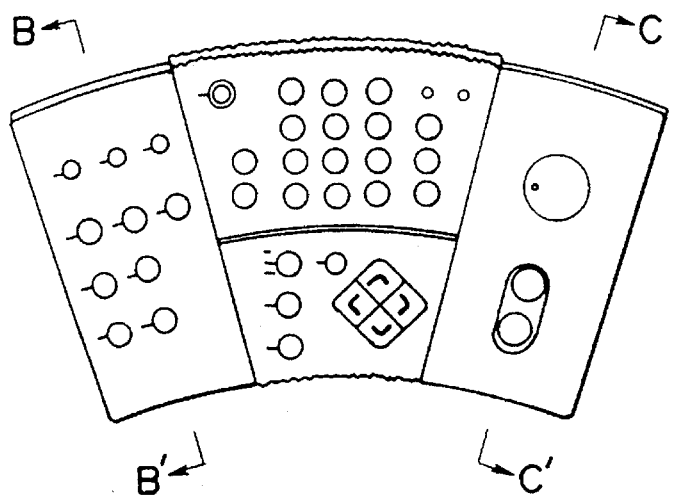
Figure 23C:
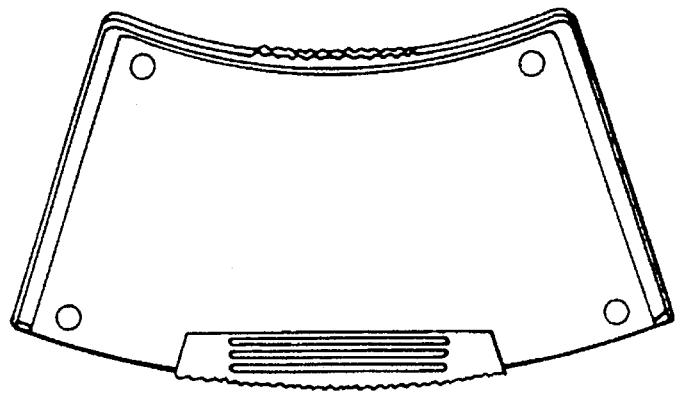
Figure 24A:
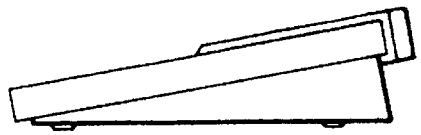
FIGS. 24(a), 24(b), 24(c), 24(d), 24(e) and 24(f) show the control keyboard of the second embodiment, and are a right side view, a left side view, a rear view, a schematic sectional view taken along line A–A' in FIG. 23(a), a schematic sectional view taken along line B–B' in FIG. 23(b) and a schematic sectional view taken along line C–C' in FIG. 23(b), respectively.
Figure 24B:
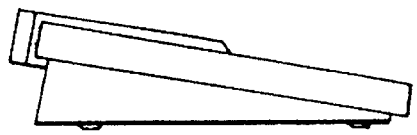
Figure 24C:
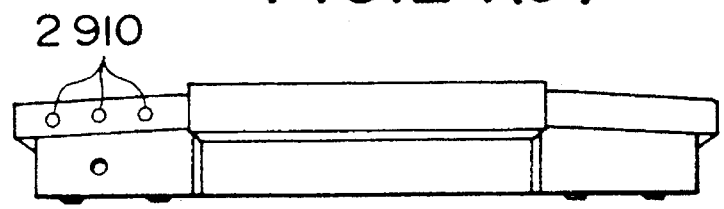
Figure 24D:
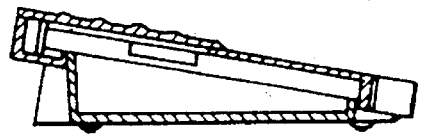
Figure 24E:
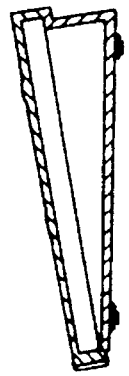
Figure 24F:
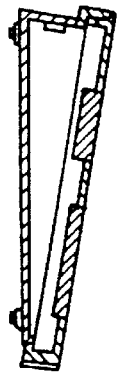

In the drawings, FIGS. 23(a), 23(b) and 23(c) are a front view, a plan view and a bottom view, respectively, of the control keyboard 2002. FIGS. 24(a), 24(b), 24(c), 24(d), 24(e) and 24(f) are a right side view of the control keyboard 2002, a left side view thereof, a rear view thereof, a schematic sectional view thereof taken along line A–A' in FIG. 23(a), a schematic sectional view thereof taken along line B–B' in FIG. 23(b), and a schematic sectional view thereof taken along line C–C' in FIG. 23(b), respectively. In FIG. 24(c), numeral 2910 represents the terminals for connecting the external microphones.

Figure 25A:
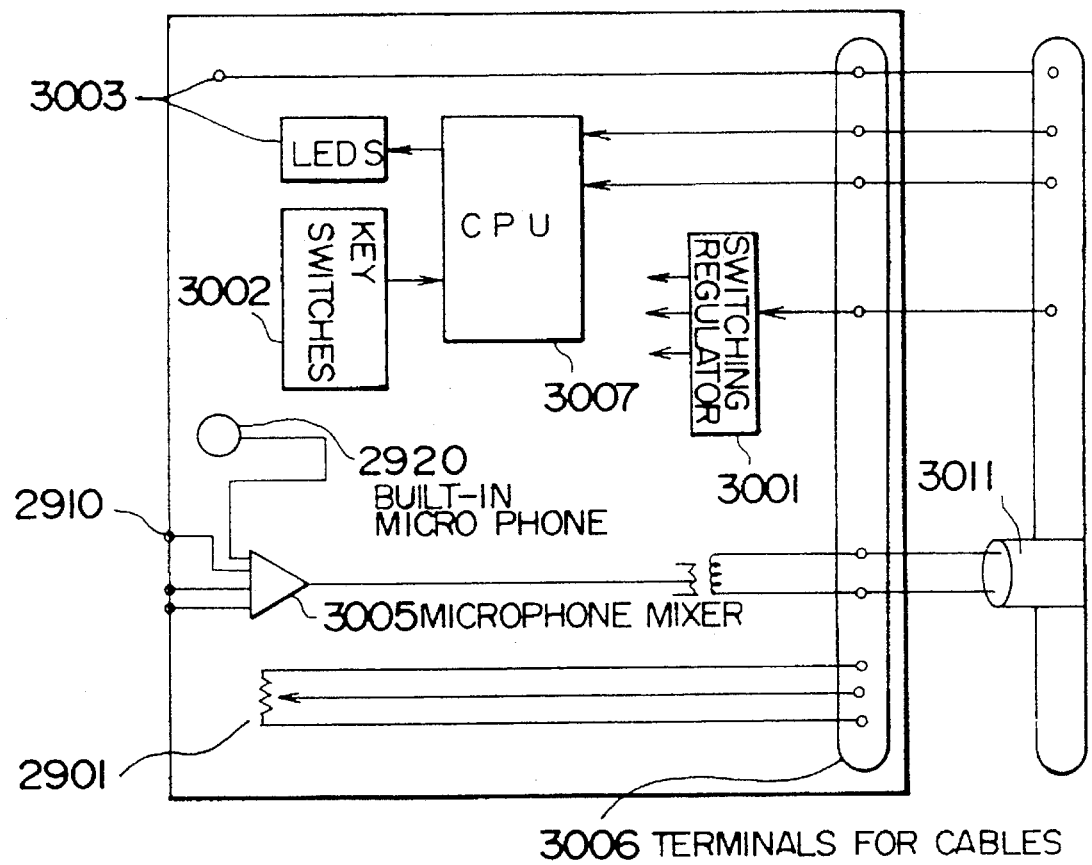
FIGS. 25(a) and 25(b) are a block diagram and a schematic diagram showing the circuit arrangement of the control keyboard of the second embodiment, respectively.
Figure 25B:
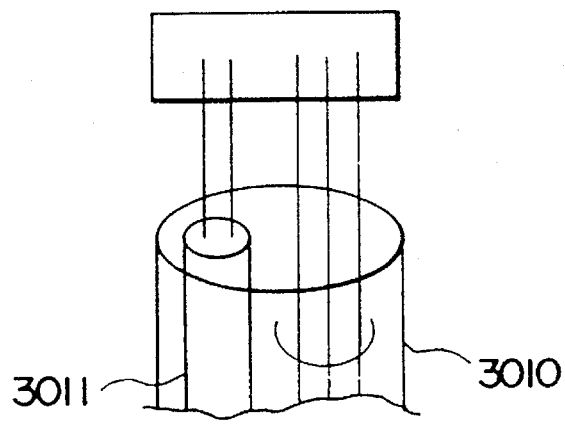

FIGS. 25(a) and 25(b) show the internal construction of the control keyboard 2002.

As shown in FIG. 25(a), the control keyboard 2002 includes a switching regulator 3001 by which a supply voltage fed from the teleconference module 2001 is distributed to the individual parts of this control keyboard, key switches 3002 which constitute the various keys stated before, and LED's 3003. In addition, it includes a CPU 3007 which controls the key switches 3002 and the LED's 3003 while performing the serial data communications with the teleconference module 2001 by the use of data clock pulses supplied from this teleconference module. Also included are the built-in microphone 2920, the microphone jacks 2910 for connecting the external microphones 2003, a microphone mixer 3005 for mixing an input from the built-in microphone 2920 and inputs from the external microphones 2003, and the volume control 2901 for adjusting the levels of audio signals transferred from the audio signal output terminals 2818 and 2823 by the teleconference module 2001. Shown at numeral 3006 are terminals for cables 3010 which lead to the teleconference module 2001.

As can be seen from the figures, the connections between this control keyboard 2002 and the teleconference module 2001 are collectively effected by the single composite cable 3010. Besides, an output from the microphone mixer 3005 is sent to the teleconference module 2001 through a transformer of 600 ohms by the use of a shielded cable 3011 which is disposed in the composite cable 3010 as shown in FIG. 25(b).

Next, the document photographing stand 2004 will be explained.

Figure 26:
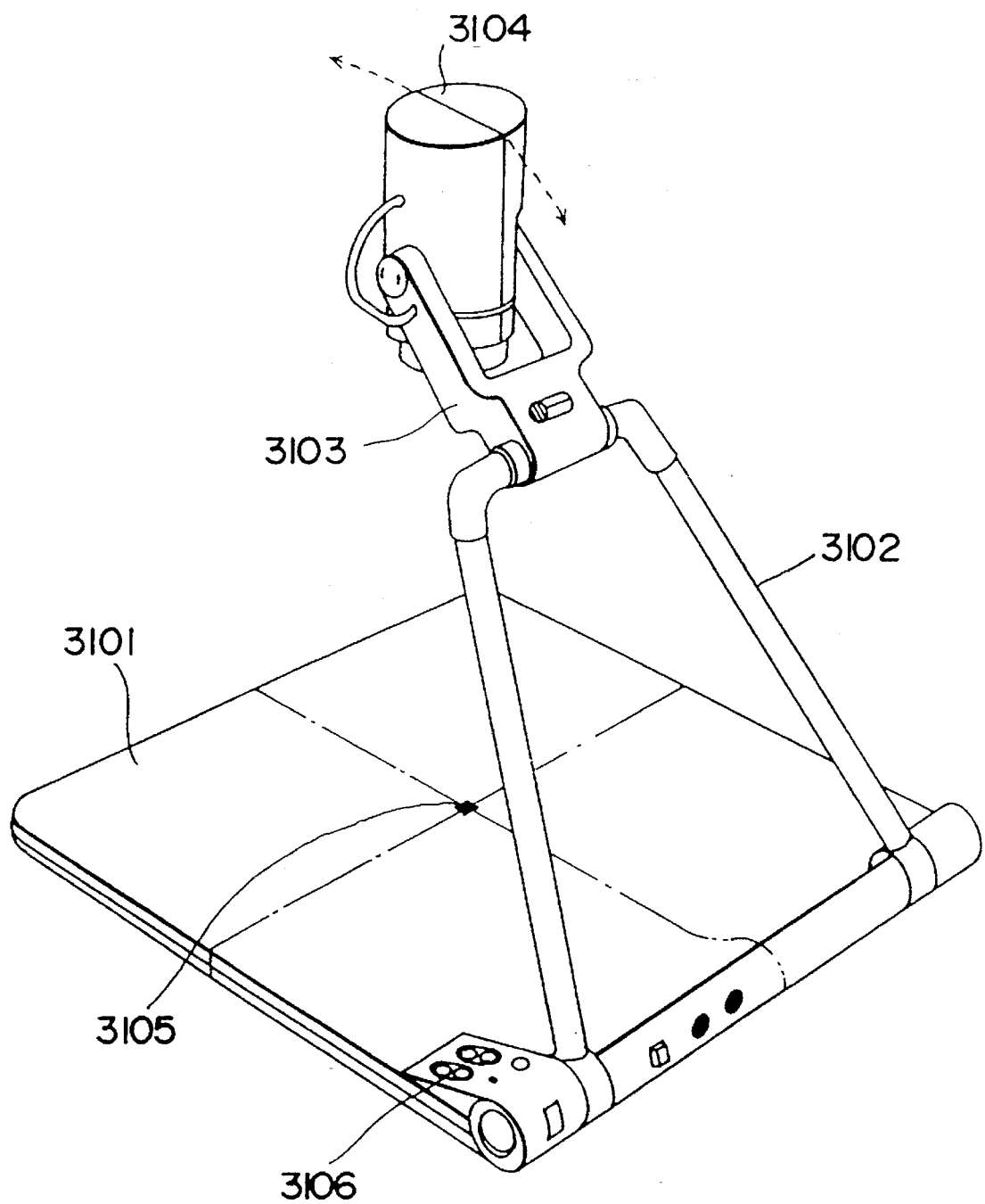
FIG. 26 is an exterior view showing the construction of a document photographing stand according to the second embodiment of the present invention.
Figure 27A:
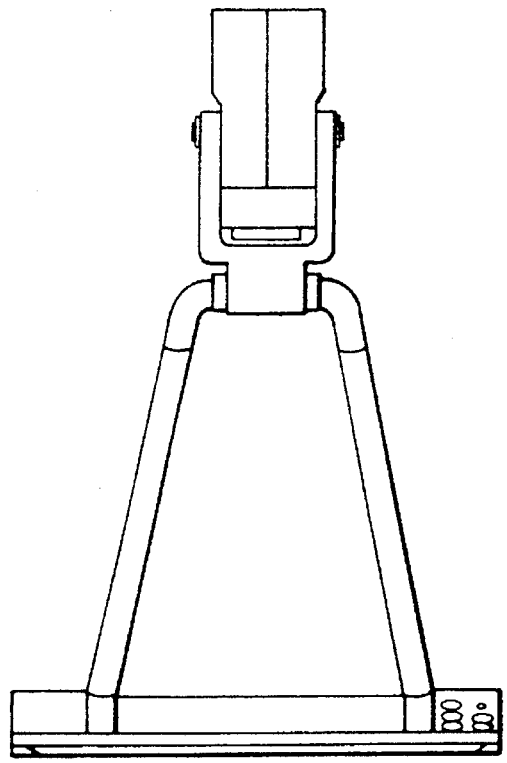
FIGS. 27(a), 27(b), 27(c) and 27(d) are a front view, a right side view, a plan view and a bottom view of the document photographing stand of the second embodiment, respectively.
Figure 27B:
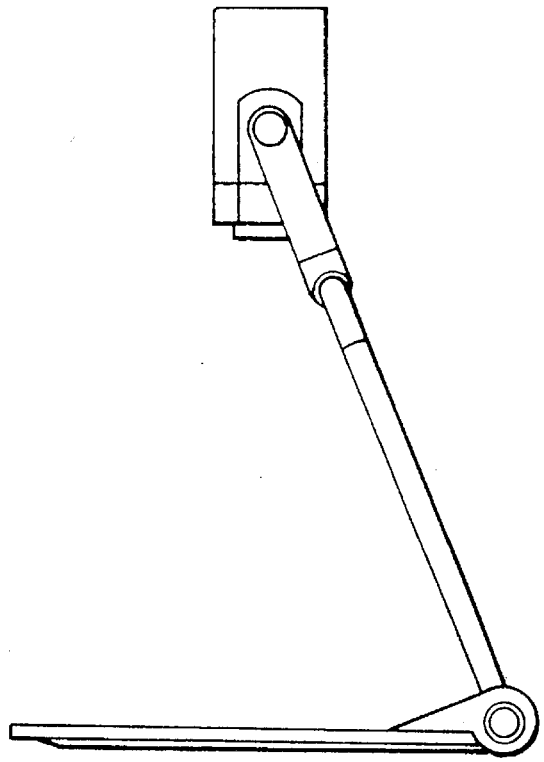
Figure 27C:
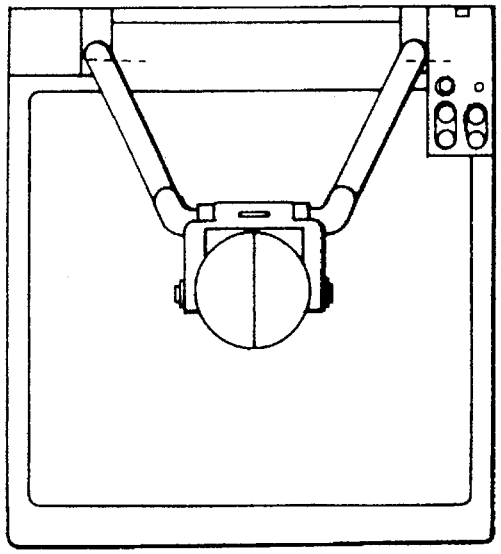
Figure 27D:
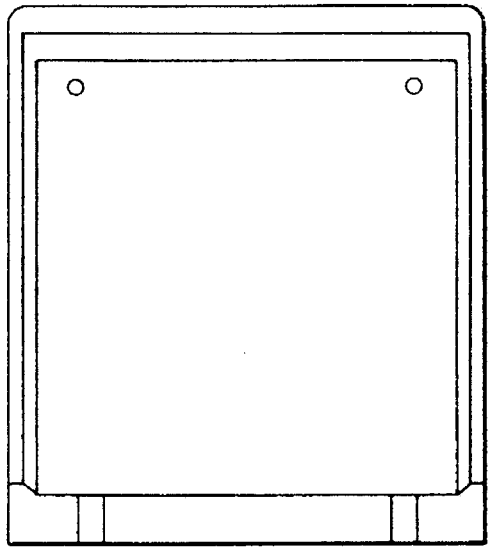

FIG. 26 shows the external appearance of the document photographing stand 2004.

Roughly speaking, the document photographing stand 2004 is constructed of a platen 3101, a lower link 3102, an upper link 3103 and the camera 3104. Besides, an LED 3105 is embedded in the central part of the platen 3101, and camera controlling keys 3106 are disposed at one corner of the platen 3101. The camera controlling keys 3106 include zooming control keys (wide angle/telescopic), an autofocusing function enabling key and a manual focusing controlling key for the camera 3104.

The lower link 3102 is pivotally mounted on the platen 3101, the upper link 3103 is pivotally mounted on the lower link 3102, and the camera 3104 is pivotally mounted on the upper link 3103. Thus, the camera 3104 can photograph, not only a document set on the platen 3101, but also spaces before and behind the platen 3101. Accordingly, when the blackboard 2005 is arranged behind the platen 3101 as shown in FIG. 14 referred to before, characters, patterns etc. written and drawn on this blackboard can be photographed and transmitted except during the photographing of the document.

The LED 3105 embedded in the upper surface of the platen 3101 serves to facilitate the positioning of the document to-be-photographed. More specifically, when an illuminator is provided in this manner, the central point of photographing can be readily grasped with transmitted light even for a paper or the like which is placed on the platen 3101 for the photographing. Herein, LED's may well be disposed at the four corners of a photographing region on the platen 3101 for a document of standard size (for example, A4-format or B5-format). Owing to the transmitted light beams of such LED's, the desired region of a document larger than the standard size can be grasped and photographed more easily than with a conventional platen on which the four corners are marked.

In the drawings, FIGS. 27(a), 27(b), 27(c) and 27(d) are a front view, a right side view, a plan view and a bottom view, respectively, of the document photographing stand 2004. FIGS. 28(a) and 28(b) are a rear view and a left side view, respectively, of the document photographing stand 2004.

Figure 30A:
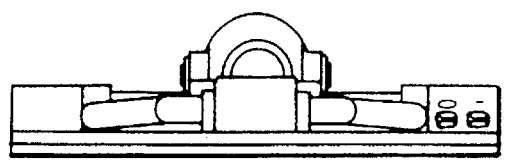
FIGS. 30(a), 30(b) and 30(c) are a front view, a right side view and a plan view showing the folded state of the document photographing stand of the second embodiment, respectively.
Figure 30B:
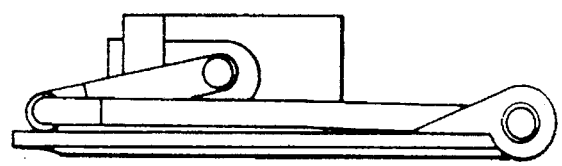
Figure 30C:
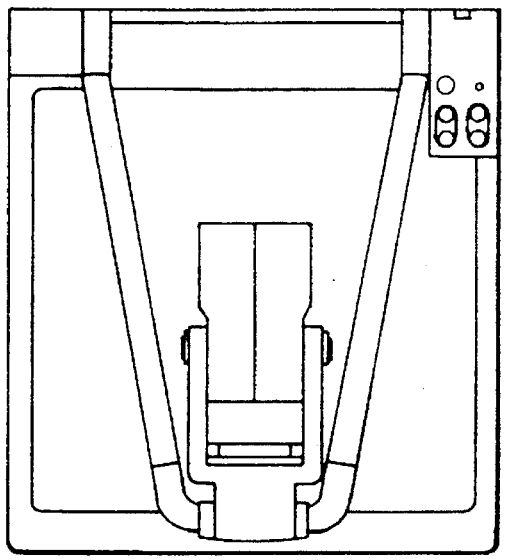

In the document photographing stand 2004 according to this embodiment, as shown in FIG. 29(a), the length l of the lower link 3102 is set so as not to exceed the length L of the platen 3101, and the length m of the upper link 3103 is set so as to be shorter than the length l of the lower link 3102. Besides, as shown in FIG. 29(b), the width N between both the arms of the lower link 3102 is set greater than the width n between both the arms of the upper link 3103. Accordingly, as seen from a front view, a side view and a plan view depicted in FIGS. 30(a), 30(b) and 30(c), respectively, the lower link 3102 can be folded on the platen 3101, and the upper link 3103 can be folded inside the lower link 3102. Thus, the document photographing stand 2004 can be carried or stored in a compact state.

Finally, the man-machine interface of the teleconference system will be explained.

Figure 31:
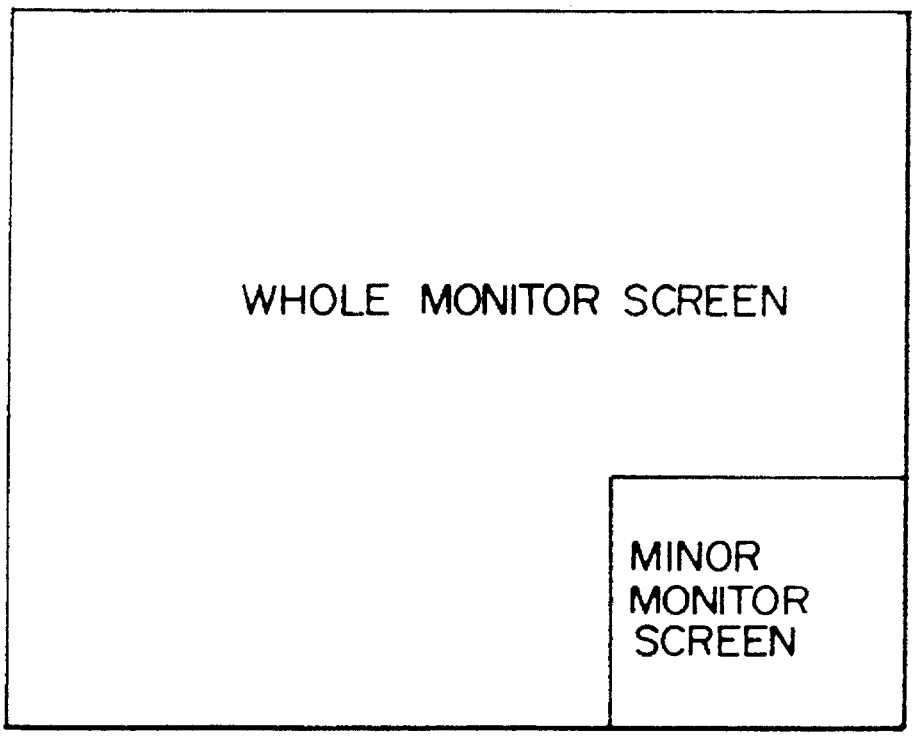
FIG. 31 is an explanatory view showing the situation of the minor frame display of a display unit according to the second embodiment of the present invention.

During a teleconference, the received picture of the opposite communicating side is usually displayed on the screen of the display unit 2007. When the monitor/PIP key of the control keyboard 2002 stated before is depressed, the teleconference module 2001 presents a minor frame at the right corner of the monitor screen and displays the self-picture thereof photographed by its own camera 2807, as illustrated in FIG. 31. Further, when the monitor/PIP key is depressed in this state, the teleconference module 2001 displays the self-picture on the whole monitor screen, and when the key is depressed again, the module 2001 brings the screen back into the usual state and displays the picture of the opposite communicating side on the whole monitor screen. Such a picture-in-picture display process has been detailed in connection with the first embodiment.

In addition, the teleconference module 2001 guides operations and reports statuses by the use of the display of the display unit 2007.

Figure 32:
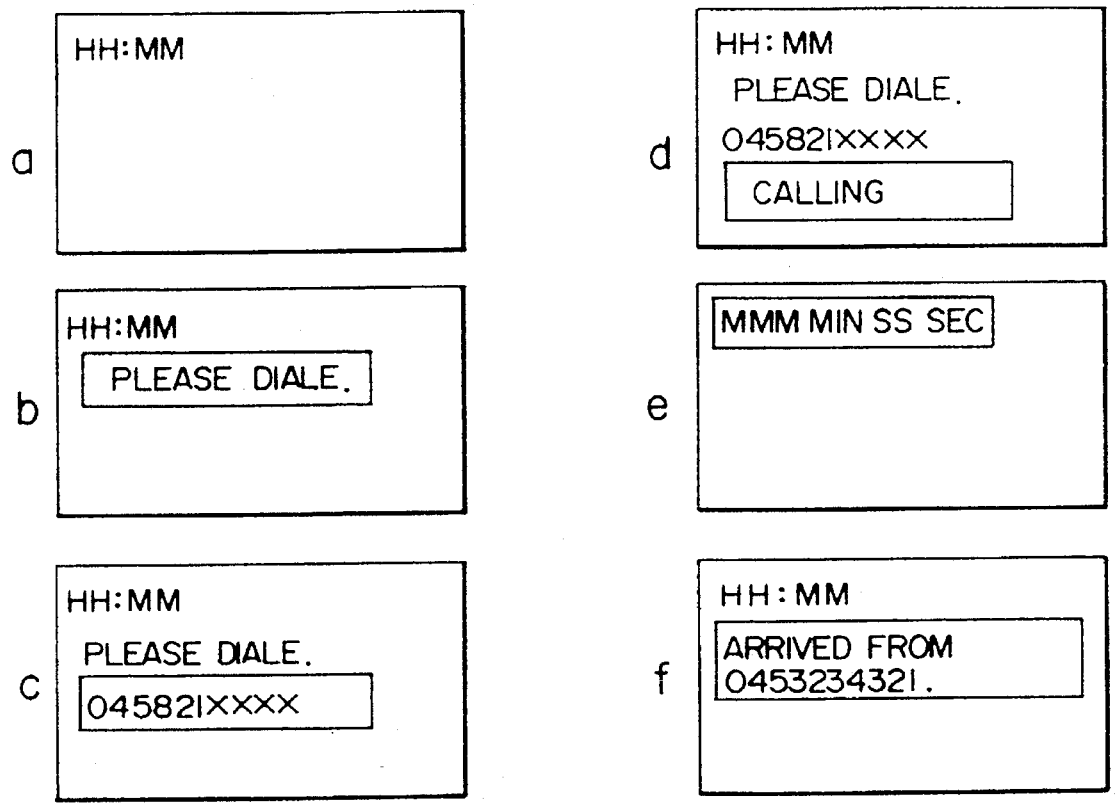
FIG. 32 is an explanatory diagram showing messages which are displayed on the screen of the display unit of the second embodiment.

FIG. 32 illustrates the situations of the operation guidance and status report utilizing the monitor screen.

Letter a in FIG. 32 denotes the display of the display unit 2007 at the closure of the power supply. The current time is indicated at the left upper corner part of the display screen of the display unit 2007.

When the start key of the control keyboard 2002 is depressed in this state, the monitor display is changed as shown at b in FIG. 32, and a message for promoting a dial input is indicated. Subsequently, when the numerals of the telephone No. of the opposite communicating side for the teleconference are input with the numerical keys of the control keyboard 2002, they are successively indicated as shown at c in FIG. 32. Next, when the start key is depressed again by the operator of the control keyboard 2002 having acknowledged the indicated telephone No., the teleconference module 2001 establishes a channel with the ISDN to transmit the input No., and it presents a display to the effect of calling the opposite terminal as shown at d in FIG. 32. Then, when communications with the opposite terminal have begun, an elapsed time since the beginning is indicated as shown at e in FIG. 32.

On the other hand, in a case where a reception has arrived at the teleconference module 2001 in a non-communicating period, a display to the effect that the reception has arrived is presented together with the telephone No. of a transmitting source as shown at f in FIG. 32.

Moreover, the teleconference module 2001 according to this embodiment offers other various functions in a menu form.

Figure 33:
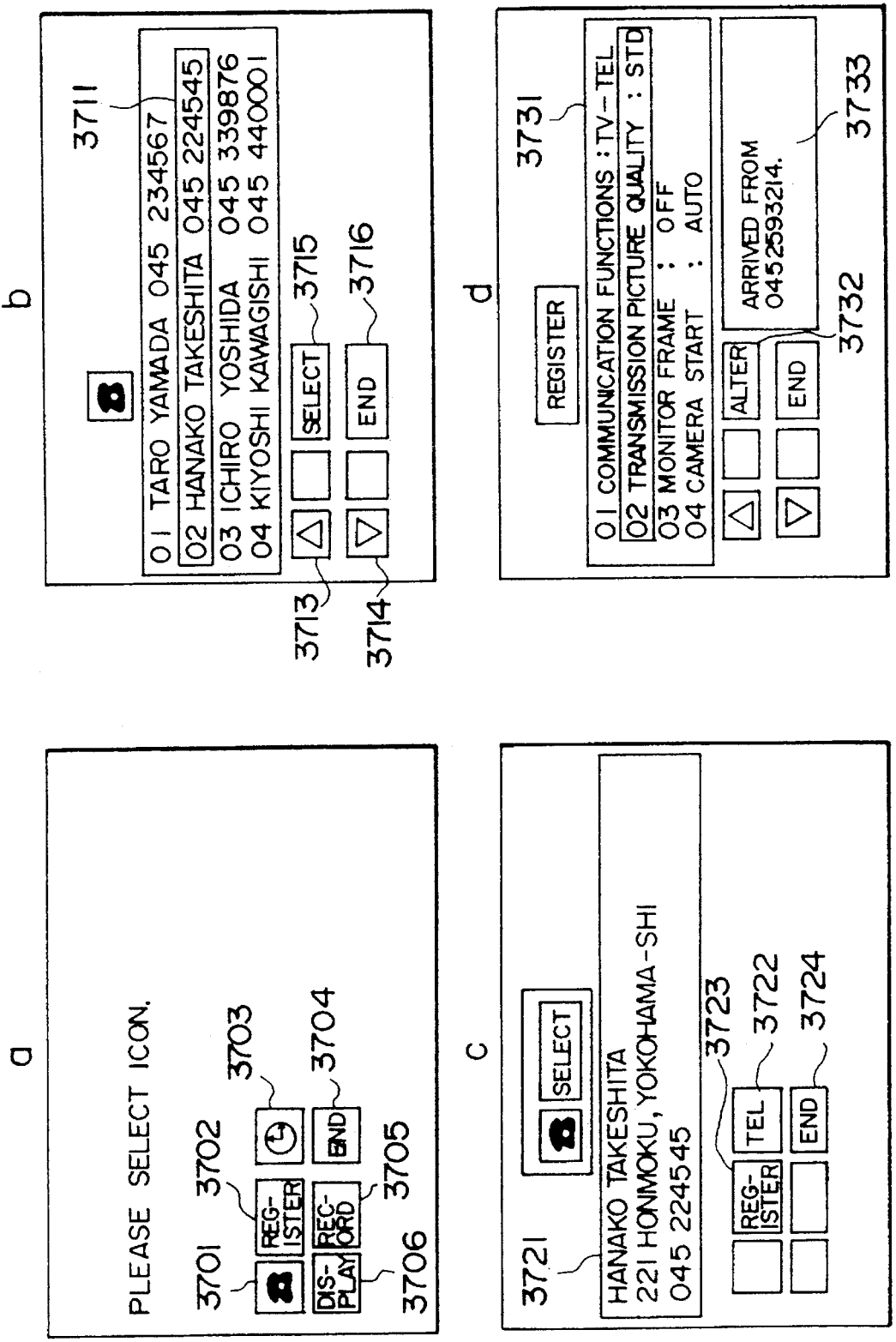
FIG. 33 is an explanatory diagram showing graphic user interfaces which the teleconference module of the second embodiment offers through the display unit.

FIG. 33 illustrates menus which are displayed on the display unit 2007.

When the menu key among the control keys is depressed at the closure of the power supply or during the communications, that is, in the display state shown at a or e in FIG. 32, the main menu shown at a in FIG. 33 is displayed.

In the menu a in FIG. 33, patterns are icons which are provided in correspondence with the offered functions. The icon 3701 serves to start a telephone directory function, the icon 3702 serves to start the function of setting any of the various statuses of the teleconference module 2001 such as the communication mode and display mode thereof, the icon 3703 serves to start the function of adjusting the time of a timepiece built into the teleconference module 2001, the icon 3705 serves to start the function of handling information items (opposite communicating sides, telephone Nos, fees, etc.) on past communications, and the icon 3706 serves to select whether or not the time displays shown in FIG. 32 are presented. Besides, the icon 3704 serves to end the menu. The respective icons are displayed in an arrangement corresponding to the arrangement of the numerals 1–6 of the numerical keys of the control keyboard 2002, and the depression of the key at the corresponding position starts the function which is offered by the pertinent icon.

By way of example, when the telephone directory function is started by depressing the numeral key "1", a menu as shown at b in FIG. 33 is displayed. More specifically, the same pattern as the icon having started this function is indicated at the uppermost part, and the names and telephone Nos. of the opposite communicating persons already registered are indicated in an area 3711. The user scrolls the indication within the area 3711 by designating an icon 3713 or 3714 through the depression of the numerical key at the corresponding position and then appoints the opposite communicating person whose information is to be handled, by designating a select icon 3715 through the depression of the numerical key at the corresponding position. An icon 3716 is one for returning to the menu picture a in FIG. 33.

Here, when the select icon 3715 is designated, a menu shown at c in FIG. 33 is displayed. The patterns of the icon which has started the corresponding function and the icon which was indicated at the uppermost part of the parent menu of this menu are indicated at the uppermost part, and all information items registered as relevant to the selected communicating person are indicated in an area 3721. A TEL icon 3722 serves to designate a transmission to the opposite communicating person indicated in the area 3721. When the numerical key corresponding to this icon is depressed, the teleconference module 2001 calls the selected communicating person in accordance with the registered information and ends the menu processing steps, to shift to the display shown at d in FIG. 32. An icon 3724 in the menu c in FIG. 33 serves to alter the registered information by way of example. More specifically, when the numerical key corresponding to this icon is depressed, the function of, e.g., altering the registered information is indicated, and a new menu corresponding to the function is displayed. In the new menu, necessary input functions are similarly assigned to the keys of the control keyboard 2002 so as to accept the user's inputs of information. Herein, by way of example, alternatives to an input character are sequentially changed-over in accordance with a predetermined input key. Moreover, the conversion of inputs into Chinese characters can be realized by expanding the function of a predetermined input key.

Meanwhile, in a case where the register icon 3702 has been designated in the main menu a in FIG. 33, a menu shown at d in FIG. 33 is displayed. In this menu d in FIG. 33, the current statuses of the teleconference module 2001 are indicated in an area 3731. The user designates any indicated item and also designates an alternative icon 3732 in accordance with steps similar to those of the operation of the menu b in FIG. 33, whereby the status of the designated item can be set anew to another alternative registered beforehand.

In this regard, in a case where the teleconference module 2001 has been called amidst such a hierarchic menu process, a display to the effect that a reception has arrived is presented in an area 3733.

Although, in this embodiment, the display unit 2007 has been described as the CRT display device, it may well be a different one such as a liquid-crystal display device or a projection display device. Moreover, although this embodiment has been chiefly described as to the case of placing the teleconference module 2001 on the display unit 2007 or the display rack 2008, the teleconference module 2001 may well be placed and used at any position where the built-in camera 2807 thereof can photograph the user.

Incidentally, the teleconference module 2001 according to this embodiment can similarly realize a video telephone system. By way of example, when this teleconference module 2001 is connected to any of television receivers placed in the living rooms of most homes, the video telephone system can be constructed. In such an application, the teleconference module of this embodiment might be named a "video telephone module", but these modules are substantially identical.

As described above, according to the second embodiment, it is possible to provide the teleconference module which is the single equipment being small in size and easily portable and which can realize the teleconference system and the video telephone system when connected to the existing display unit.

What is claims is:

1. A teleconference terminal equipment for exchanging pictures and speech with an opposite communicating terminal equipment through a communication circuit, comprising:

a united body including:

communication control means for controlling transmission and reception of communication frames stipulated in CCITT recommendation H.221 through a digital communication channel provided by a basic interface of an ISDN, each communication frame being capable of containing video data, audio data, user data and control data, multiplex/demultiplex means for multiplexing and demultiplexing the video data, audio data, user data and control data of each of the communication frames to be transmitted by said communication control means and each of the communication frames received by the same, respectively, a picture codec which decodes a picture signal from said video data demultiplexed from within said communication frame by said multiplex/demultiplex means and then delivers said picture signal as an output, and which codes an input picture signal to-be-coded into said video data and then transfers said video data to said multiplex/demultiplex means, said video data being coded in conformity with an algorithm stipulated in CCITT recommendation H.261, a camera which supplies said picture codec with a picked-up picture signal as said picture signal to-be-coded, a display which displays a picture indicated by said picture signal decoded by said picture codec, an audio codec which decodes speech data from said audio data demultiplexed from within said communication frame by said multiplex/demultiplex means and then delivers the decoded speech data as an output, and which codes input speech data to-be-coded and then transfers the coded speech data to said multiplex/demultiplex means, a digital-to-analog converter by which said decoded speech data delivered from said audio codec is converted into an audio analog signal, a microphone which supplies a picked-up audio signal, an audio switch, an analog-to-digital converter which converts said picked-up audio signal into picked-up audio data and supplies the picked-up audio data to said audio switch, a loudspeaker which emits speech based on said audio analog signal produced by said digital-to-analog converter, and a digital audio input/output interface for connecting said audio switch to an external device which inputs and outputs audio data, said digital audio input/output interface supplies said audio switch with audio data from said external device, and supplies decoded speech data produced by said audio codec to said external device, said audio switch supplies either one of said picked-up audio data or said audio data to said audio codec as said speech data to-be-coded.

2. A teleconference terminal equipment for exchanging pictures and speech with an opposite communicating terminal equipment through a communication circuit, comprising a united body including:

communication control means for controlling transmission and reception of communication frames through a digital communication channel according to a predetermined communication protocol, each communication frame being capable of containing video data, audio data, user data and control data, multiplex/demultiplex means for multiplexing and demultiplexing the video data, audio data, user data and control data of each of the communication frames to be transmitted by said communication control means and each of the communication frames received by the same, respectively, a picture codec which decodes a picture signal from said video data demultiplexed from within said communication frame by said multiplex/demultiplex means and then delivers said picture signal as an output, and which codes an input picture signal to-be-coded into said video data and then transfers said video data to said multiplex/demultiplex means, a camera which supplies said picture codec with a picked-up picture signal as said picture signal to-be-coded, a display which displays a picture indicated by said picture signal decoded by said picture codec, an audio codec which decodes an analog speech signal from said audio data demultiplexed from within said communication frame by said multiplex/demultiplex means and then delivers the decoded audio signal as an output, and which codes an input analog audio signal to-be-coded into said audio data and then transfers said audio data to said multiplex/demultiplex means, an audio switch, a microphone which supplies said audio switch with a picked-up analog audio signal, a loudspeaker which emits speech based on said analog audio signal decoded by said audio codec, and a modular jack having a half-duplex interface for connecting said audio switch to an external facsimile machine of group 3 type recommended by CCITT (G3 facsimile machine), said modular jack supplies said audio switch with a G3 facsimile transmission signal from said G3 facsimile machine and delivers said decoded analog audio signal produced by said audio codec to said external G3 facsimile machine, said audio switch supplies either one of said picked-up analog audio signal or said G3 facsimile transmission signal to said audio codec as said analog audio signal to-be-coded.

3. A teleconference terminal equipment for exchanging pictures and speech with an opposite communicating terminal equipment through a communication circuit, comprising:

a united body including:

communication control means for controlling transmission and reception of communication frames through a digital communication channel according to a predetermined communication protocol, each communication frame being capable of containing user data which is capable of containing data from a facsimile machine of a group 3 type recommended by CCITT (G3 facsimile data), video data, audio data, and control data, multiplex/demultiplex means for multiplexing and demultiplexing the video data, audio data, user data and control data of each of the communication frames to be transmitted by said communication control means and each of the communication frames received by the same, respectively, a picture codec which decodes a picture signal from said video data demultiplexed from within said communication frame by said multiplex/demultiplex means and then delivers said picture signal as an output, and which codes an input picture signal to-be-coded into said video data and then transfers said video data to said multiplex/demultiplex means, a camera which supplies said picture codec with a picked-up picture signal as said picture signal to-be-coded, a display which displays a picture indicated by said picture signal decoded by said picture codec, an audio codec which decodes an analog speech signal from said audio data demultiplexed from within said communication frame by said multiplex/demultiplex means and then delivers the decoded speech signal as an output, and which codes an input analog speech signal to-be-coded into said audio data and then transfers said audio data to said multiplex/demultiplex means, a microphone which supplies said audio codec with a picked-up analog speech signal as said analog speech signal to-be-coded, a loudspeaker which emits speech based on said analog speech signal decoded by said audio codec, a codec for a facsimile machine, said codec decodes G3 facsimile data contained in said user data multiplexed by said multiplex/demultiplex means into an analog facsimile signal, and codes an analog facsimile signal to-be-coded into G3 facsimile data and supplies said multiplex/demultiplex means with said G3 facsimile data as said user data to be multiplexed by said multiplex/demultiplex means, and a modular jack of a half-duplex interface for connecting said teleconference terminal equipment to a G3 facsimile machine of a group 3 type recommended by CCITT (G3 facsimile machine, said modular jack receives a G3 facsimile transmission signal from said G3 facsimile machine, supplies said codec with said received G3 facsimile transmission signal as said analog facsimile signal to-be-coded and delivers the decoded analog facsimile signal produced by said codec to said G3 facsimile machine.

4. A teleconference module comprising:

communication control means for controlling transmission and reception of video data through a digital communication channel;

a communication terminal for said digital communication channel;

an external video output terminal for an external display unit;

a picture codec which decodes a picture signal from said video data received by said communication control means and then outputs said picture signal to said external video output terminal, and which codes an input picture signal to-be-coded into said video data and then transfers said video data to said communication control means;

a camera which photographs an external subject, and by which a picture signal produced by photographing is transferred as said picture signal to-be-coded to said picture codec; and a box-shaped housing in which said communication control means, said picture codec and said camera are housed, said box-shaped housing accommodating no internal display for displaying a picture indicated by said picture signal therein;

wherein said camera is arranged in a central position of said box-shaped housing with respect to a horizontal direction, so as to photograph an external subject through a window provided in a central position, with respect to a horizontal direction, of a front panel of said box-shaped housing;

said communication terminal and said external video output terminal are provided on a panel of said box-shaped housing other than said front panel;

said box-shaped housing has a size permitting said teleconference module to be placed on top of the external display unit; and said teleconference module constitutes, in combination with the external display unit, a teleconference terminal for exchanging pictures with an opposite communicating equipment through the communication channel in combination with the external display when said teleconference module is placed on top of the external display unit, said external output video terminal connects with the external display unit and said communication terminal connects with the digital communication channel.

5. A teleconference module comprising:

communication control means for controlling transmission and reception of video data through a digital communication channel;

a communication terminal for said digital communication channel;

an external video output terminal for an external display unit;

a picture codec which decodes a picture signal from said video data received by said communication control means and then outputs said picture signal to said external video output terminal, and which codes an input picture signal to-be-coded into said video data and then transfers said video data to said communication control means;

a camera which photographs an external subject, and by which a picture signal produced by photographing is transferred as said picture signal to-be-coded to said picture codec;

an external audio input terminal for an external microphone;

an external audio output terminal for an external loudspeaker;

an audio codec which decodes a speech signal from said audio data demultiplexes by said multiplex/demultiplex means and then outputs said speech signal to said external audio output terminal, and by which an input speech signal to-be-coded input from said external audio input terminal is coded into speech data; and a box-shaped housing in which said communication control means, said multiplex/demultiplex means, said picture codec, said camera and said audio codec are housed, said box-shaped housing accompanying no internal display for displaying a picture represented by said picture signal therein;

wherein said camera is arranged in a central position of said box-shaped housing with respect to a horizontal direction so as to photograph an external subject through a window provided in a central position of a front panel of said box-shaped housing with respect to a horizontal direction;

said communication terminal, said external video output terminal, said external audio input terminal and said external audio output terminal are provided on a panel of said box-shaped housing other than said front panel;

said box-shaped housing has a size permitting said teleconference module to be placed on top of the external display unit; and said teleconference module constitutes, in combination with the external display unit, external microphone and external loudspeaker, a teleconference terminal for exchanging pictures with an opposite communicating equipment through the communication channel, in combination with the external display when said teleconference module is placed on top of the external display unit, said external output video terminal connects with the external display unit, external audio input terminal connects with the external microphone, said external audio output terminal connects with the external loudspeaker and said communication terminal connects with the digital communication channel.

6. A teleconference module as defined in claim 4, wherein said communication terminal and said external video output terminal are provided on the panel of said box-shaped housing other than said front panel.

7. A teleconference module as defined in claim 5, wherein said communication terminal, said external video output terminal, said external audio input terminal and said external audio output terminal are provided on the panel of said box-shaped housing other than said front panel.

8. A teleconference module as defined in claim 6, which comprises an external data input/output terminal;

wherein said communication control means controls transmission of the user data input from the external data input/output terminal through a digital communication channel, and outputting the user data received from said communication channel to said external data input/output terminal, and said external data input/output terminal is provided on the panel of said box-shaped housing other than said front panel.

9. A teleconference module as defined in claim 7, which comprises an external data input/output terminal;

wherein said communication control means controls transmission of the user data input from the external data input/output terminal through a digital communication channel, reception of the user data through a digital communication channel, and outputting the user data received from said communication channel to said external data input/output terminal, and said external data input/output terminal is provided on the panel of said box-shaped housing other than said front panel.

* * * * *